United States Patent [19]
Ehlers et al.

[11] Patent Number: 5,924,486
[45] Date of Patent: Jul. 20, 1999

[54] ENVIRONMENTAL CONDITION CONTROL AND ENERGY MANAGEMENT SYSTEM AND METHOD

[75] Inventors: Gregory A. Ehlers, Tampa; Richard M. Silva, St. Petersburg, both of Fla.

[73] Assignee: Tecom, Inc., Tampa, Fla.

[21] Appl. No.: 08/960,748

[22] Filed: Oct. 29, 1997

[51] Int. Cl.⁶ .................................. F23N 3/00; H02J 1/00
[52] U.S. Cl. ........................ 165/238; 165/255; 236/46 R; 307/39
[58] Field of Search ..................................... 165/255, 238; 236/46 R, 47; 364/492, 557; 307/39

[56] References Cited

U.S. PATENT DOCUMENTS

| | | |
|---|---|---|
| 1,547,242 | 7/1925 | Strieby . |
| 4,075,699 | 2/1978 | Schneider et al. ...................... 364/492 |
| 4,174,517 | 11/1979 | Mandel .................................... 340/310 |
| 4,217,646 | 8/1980 | Caltagirone et al. ................... 165/238 |
| 4,218,737 | 8/1980 | Buscher et al. ......................... 364/493 |
| 4,245,319 | 1/1981 | Hedges .................................... 364/492 |
| 4,291,375 | 9/1981 | Wolf ........................................ 364/483 |
| 4,324,987 | 4/1982 | Sullivan, II et al. ..................... 307/35 |
| 4,336,462 | 6/1982 | Hedges et al. ............................ 307/35 |
| 4,367,414 | 1/1983 | Miller et al. .............................. 307/38 |
| 4,382,544 | 5/1983 | Stewart .................................... 165/238 |
| 4,466,074 | 8/1984 | Jindrick et al. ......................... 364/145 |
| 4,475,193 | 10/1984 | Brown ..................................... 370/124 |
| 4,503,288 | 3/1985 | Kessler ................................... 179/2 DP |
| 4,511,979 | 4/1985 | Amirante ................................. 364/481 |
| 4,513,189 | 4/1985 | Ueda et al. ........................ 219/10.55 B |

(List continued on next page.)

FOREIGN PATENT DOCUMENTS

| | | |
|---|---|---|
| 2121124 | 7/1993 | Canada .......................... G05D 23/19 |
| 0163572 A1 | 12/1985 | European Pat. Off. ......... H02J 13/00 |
| 0288413 A1 | 10/1988 | European Pat. Off. ...... G01R 21/133 |
| 0534839 A1 | 3/1993 | European Pat. Off. ........ H05B 37/03 |
| 0577532 A1 | 1/1994 | European Pat. Off. ........... H02J 3/14 |
| 0580217 A1 | 1/1994 | European Pat. Off. ........... H02J 3/14 |
| 0 688 085 A1 | 12/1995 | European Pat. Off. ......... H02J 13/00 |

(List continued on next page.)

OTHER PUBLICATIONS

Eaton Corporation, Cutler–Hammer—Westinghouse Products, Power Distribution Components Division "IMPACC System Communications," IL 17384, (May 1995), Rev. 2.1, Appendix E (title, page, contents listing and pp. E–1 through E4).

Westinghouse Electric Corporation, Electrical Components Division, "Instructions for F Frame, IQ Energy Sentinel," IL 17459, (Effective Nov. 1992).

(List continued on next page.)

*Primary Examiner*—William Wayner
*Attorney, Agent, or Firm*—Wolf Grenfield & Sacks, P.C.

[57] ABSTRACT

An indoor environmental condition control and energy management system includes a plurality of inputs. A user input receives user input parameters including a desired indoor environmental condition range for at least one energy unit price point. An indoor environmental condition input receives a sensed indoor environmental condition. An energy price input receives a schedule of projected energy unit prices per time periods. A processor, coupled to the inputs, computes an environmental condition deadband range for multiple energy unit price points based on the user input parameters and controls at least one energy-consuming load device to maintain the indoor environmental condition within the computed deadband range for a then-current energy unit price point. In an embodiment, the environmental condition includes at least temperature and the at least one load device includes a heating and cooling system. The processor, in one embodiment, communicates through a communications link with at least one energy supply company and selects one energy supply company for a premise to minimize energy consumption cost.

37 Claims, 6 Drawing Sheets

U.S. PATENT DOCUMENTS

| | | | |
|---|---|---|---|
| 4,514,594 | 4/1985 | Brown et al. ............................ | 179/2.51 |
| 4,520,576 | 6/1985 | Vander Molen ............................ | 34/45 |
| 4,521,645 | 6/1985 | Carroll ............................ | 179/5 R |
| 4,523,307 | 6/1985 | Brown et al. ............................ | 370/30 |
| 4,539,562 | 9/1985 | Sanders ............................ | 340/657 |
| 4,549,274 | 10/1985 | Lerner et al. ............................ | 364/492 |
| 4,567,557 | 1/1986 | Burns ............................ | 364/145 |
| 4,630,218 | 12/1986 | Hurley ............................ | 364/481 |
| 4,633,775 | 1/1987 | Olek ............................ | 379/24 |
| 4,665,544 | 5/1987 | Honda et al. ............................ | 379/104 |
| 4,697,182 | 9/1987 | Swanson ............................ | 340/870.02 |
| 4,701,698 | 10/1987 | Karlsson et al. ............................ | 324/116 |
| 4,728,949 | 3/1988 | Platte et al. ............................ | 340/825.37 |
| 4,771,185 | 9/1988 | Feron et al. ............................ | 307/39 |
| 4,772,870 | 9/1988 | Reves ............................ | 340/310 R |
| 4,819,180 | 4/1989 | Hedman et al. ............................ | 364/492 |
| 4,847,554 | 7/1989 | Goodwin ............................ | 324/127 |
| 4,847,780 | 7/1989 | Gilker et al. ............................ | 364/483 |
| 4,847,781 | 7/1989 | Brown, III et al. ............................ | 364/492 |
| 4,847,782 | 7/1989 | Brown, Jr. et al. ............................ | 364/492 |
| 4,855,922 | 8/1989 | Huddleston et al. ............................ | 364/493 |
| 4,884,021 | 11/1989 | Hammond et al. ............................ | 364/483 |
| 4,888,495 | 12/1989 | Feron et al. ............................ | 307/39 |
| 4,899,129 | 2/1990 | MacFadyen et al. ............................ | 340/310 R |
| 4,899,217 | 2/1990 | MacFadyen et al. ............................ | 358/86 |
| 4,971,136 | 11/1990 | Mathur et al. ............................ | 165/1 |
| 4,977,515 | 12/1990 | Rudden et al. ............................ | 364/492 |
| 4,987,513 | 1/1991 | Shelley ............................ | 361/92 |
| 4,998,097 | 3/1991 | Noth et al. ............................ | 340/684 |
| 5,033,112 | 7/1991 | Bowling et al. ............................ | 455/603 |
| 5,045,823 | 9/1991 | Nichols, III ............................ | 333/132 |
| 5,086,385 | 2/1992 | Launey et al. ............................ | 364/188 |
| 5,090,024 | 2/1992 | Vander Mey et al. ............................ | 375/1 |
| 5,101,191 | 3/1992 | MacFadyen et al. ............................ | 340/310 R |
| 5,109,222 | 4/1992 | Welty ............................ | 340/825.72 |
| 5,126,934 | 6/1992 | MacFadyen ............................ | 364/140 |
| 5,134,356 | 7/1992 | El-Sharkawi et al. ............................ | 323/211 |
| 5,168,170 | 12/1992 | Hartig ............................ | 307/35 |
| 5,170,360 | 12/1992 | Porter et al. ............................ | 364/483 |
| 5,196,982 | 3/1993 | Landsberg et al. ............................ | 361/93 |
| 5,218,552 | 6/1993 | Stirk et al. ............................ | 364/492 |
| 5,220,311 | 6/1993 | Schweitzer, Jr. ............................ | 340/650 |
| 5,263,046 | 11/1993 | Vander Mey ............................ | 375/1 |
| 5,274,571 | 12/1993 | Hesse et al. ............................ | 364/492 |
| 5,278,862 | 1/1994 | Vander Mey ............................ | 375/1 |
| 5,289,362 | 2/1994 | Liebl et al. ............................ | 364/140 |
| 5,301,122 | 4/1994 | Halpern ............................ | 364/483 |
| 5,315,499 | 5/1994 | Bilas et al. ............................ | 364/140 |
| 5,323,307 | 6/1994 | Wolf et al. ............................ | 364/140 |
| 5,347,167 | 9/1994 | Singh ............................ | 307/125 |
| 5,414,640 | 5/1995 | Seem ............................ | 364/492 |
| 5,436,510 | 7/1995 | Gilbert ............................ | 307/38 |
| 5,462,225 | 10/1995 | Massara et al. ............................ | 236/47 |
| 5,469,365 | 11/1995 | Diekema et al. ............................ | 364/483 |
| 5,475,371 | 12/1995 | Dunk et al. ............................ | 340/660 |
| 5,572,438 | 11/1996 | Ehlers et al. ............................ | 364/492 |
| 5,684,710 | 11/1997 | Ehlers et al. ............................ | 364/492 |
| 5,696,695 | 12/1997 | Ehlers et al. ............................ | 364/492 |

FOREIGN PATENT DOCUMENTS

| | | | |
|---|---|---|---|
| 2645968 A1 | 10/1990 | France ............................ | G01B 19/12 |
| 2660511 A1 | 10/1991 | France ............................ | H04O 9/02 |
| 27 43 212 A1 | 3/1979 | Germany ............................ | H02J 13/00 |
| WO93/08653 | 4/1993 | WIPO ............................ | H04B 3/56 |
| WO94/00824 | 1/1994 | WIPO ............................ | G06F 15/46 |
| WO/9403989 | 2/1994 | WIPO ............................ | H04L 27/30 |
| WO94/09572 | 4/1994 | WIPO ............................ | H04B 3/54 |

OTHER PUBLICATIONS

Eaton Corporation, Cutler–Hammer—Westinghouse Products, Power Distribution Components Division, Cutler–Hammer Consulting Application Guide, "Metering and Monitoring Devices", pp. 610–613 and "Metering, Monitoring, and Protective Devices," pp. 636–649.

"Boosting Your Homes's IQ; Manufacturers agree on standards for creating the smart house", Technology, p. 70 (not dated).

Schrock, Clifford B., "Conservation and safety for the 90's using cable TV networks", Cable Bus Systems Corp. (no ref. or date).

Dawson, Fred, "Energy saver can support voice and data", Multichannel News, (Oct. 21, 1991).

"Schlumberger launches new venture for building automation systems in Europe using Echelon Technology", Bus, Wire, (Jul. 13, 1992).

Saladyga, John S., "New home automation systems integrate security, energy and entertainment", Newsday, Inc., (Oct. 15, 1992).

Rupinski, Patrick, "New device automatically alerts company of power interruption", (no ref. or date).

Niggli, Michael R., PowerView: Two–Way Customer Communications: (no ref. or date).

"Demonstrating smarts; bright home: a demonstration home that utilizes consumer electronics . . . " Popular Science, (Jul. 1991).

"Scientific–Atlanta, Bell Atlantic To Offer Cost–Effective Information", PR Newswire, (Sep. 23, 1991) (Mary Nagelhout).

"Entergy moves into fiber optics to control residential consumption", Energy Report, (Dec. 4, 1992), vol. 20, No. 49 (sr abst).

"Commonwealth Edison installs Metricom's communication network" Business Wire, (Mar. 4, 1993).

Sanders, Michele, "Interfacing with the home of the future", Information Access, (Apr. 1993).

"PGW to begin automatic meter reader installations in 500,000 homes in Jun.", PR Newswire Assoc. (Apr. 2, 1993).

Jones, David A., "Smart Money? Home automation systems", Builder (Jun. 1993), pp. 162–166.

Millar, Heather, "Smart houses: getting switched on", Business Week, (Jun. 28, 1993).

"Is DSM having an impact on electric–utility credit ratings?", Electrical World, (Aug. 1993).

"Entergy Enterprises" CC2000 test joined by Sprint Honeywell . . . PR Newswire Assoc., (Aug. 26, 1993).

Kaplan, Daniel, "DSM Monitoring a key issue for utility industry E–source", The Energy Daily, (Oct. 5, 1993).

Jones, David, A., "Cutting edge; three houses that break the rules and break new ground . . . ", Builder Info Access, (Nov. 1993).

Piepmeier, James M. et al. "The tools of competition:" differentiation, segmentation . . . , The Electricity Journal (Nov. 1993).

Colman, Andrew et al., "Competitive edge–Power View: A DSM–focused technology", Fortnightly.

Vizard, Frank, "Building the information superhighway", Popular Mechanics, (Jan. 1994).

"Entergy announces a major development in its residential customer–controlled load manage . . . ", PR Newswire Assoc., (Jan. 19, 1994).

McLeister, Dan, "Dramatic changes lie ahead for home automation"Professional Builder & Remodeler, (Feb. 1994).

"Cebus (R) power line carrier technologies from Intellon Corp. support home automation application . . . " PR Newswire, (Mar. 1, 1994).

"Honeywell, Oracle Corp. Unveil joint technology and marketing alliance", Electric Utility Week's Demand, Side Report, (Mar. 3, 1994).

Phillips, Tim, "Welcome to the computerized home", The Guardian, (Mar. 10, 1994).

"First Pacific Networks, Central and South West Corp. to conduct energy management project in Laredo, TX", Business Wire, (Mar. 24, 1994).

"Johnson Controls makes major entry into home energy automation market . . . ", PR Newswire, (Mar. 28, 1994).

"Re–engineering electric utility metering and communications", Transmission & Distribution, (Apr. 1994).

Cain, Charles J., "Metering gets real", Fortnightly, (Apr. 1, 1994), pp. 39–40.

"Itron signs $27M contract with Baltimore Gas and Electric", PR Newswire, (Apr. 4, 1994).

"Leading companies demonstrate home automation based on Echelon's technology", Business Wire, (Apr. 14, 1994).

Salpukas, Agis, "Big hopes put on electric wires", The New York Times, (Jul. 6, 1994).

Karve, Anita, "Brainy Buildings", LAN Magazine, (Aug. 1994).

"LonWorks—the choice in home automation", Motorola, (Mar. 1994).

"Home automation: what's in it for utilities?", EPRI, (Apr. 1990).

"50 Successful DSM Programs", The Results Center, lists.

"Variable electric rates", Transtext.

"Bell of Pennsylvania's automatic meter reading could mean greater security and privacy for customers", PR Newswire, (Feb. 28, 1990).

"NetComm matures as advanced communication and metering system", Research Newsletter, 4th quarter (1990).

Teletimer Energy Savings Service: "Low–cost—high value building automation".

"PLC features & specifications", Regency Electronics, Inc.

"Using the line sharing switch in power utility load study applications", Teltone Telesolutions (1993).

Home Automation Laboratories, (Fall 1994 Catalog).

"S87C752 CMOS single–chip 8–bit microcontroller", Signetics.

Stevenson, Jr. William, "Elements of Power System Analysis", 4th Edition (1982), pp. 13–18 PCT International Search Report.

ENVIRONMENTAL CONDITION CONTROL AND ENERGY MANAGEMENT SYSTEM AND METHOD

FIELD OF THE INVENTION

The present invention relates generally to a residential or commercial environmental condition control system and, more specifically, to a system that controls internal environmental conditions to optimize comfort and minimize energy consumption and/or energy cost, based on user-defined parameters.

BACKGROUND OF THE INVENTION

Residential and commercial internal environmental condition control systems, such as temperature control systems, have been used for many years. Temperature control systems include thermostats and thermostatic control devices. These devices are designed primarily to sense the temperature inside a premise and, based on an occupant-designated temperature setting, activate a heating and/or cooling system or systems to maintain the temperature at that setting.

There exist two main types of temperature control devices. One type of temperature control device includes a standard, single temperature control device having a setting control with which an occupant can set a desired temperature and a switch to select between a heating or cooling system, only one of which will be activated at a time. The heating system, when activated, will heat the premise when the actual temperature falls below the desired temperature setting. Similarly, the cooling (i.e., air conditioning) system, when activated, will cool the premise when the actual temperature exceeds the desired setting.

Another temperature control device includes a dual temperature control device having a dual setting control attached both to a heating system and a cooling system. A user may enter two desired temperature settings, a minimum desired temperature setting which controls activation of the heating system and a maximum desired temperature setting which controls activation of the cooling system. When the actual temperature falls below the minimum desired temperature setting, the heating system automatically is activated. Similarly, when the actual temperature rises above the maximum desired temperature setting, the cooling system automatically is activated. Such a dual temperature control device allows the user to input a comfort range between two temperature settings and does not require the user to manually activate either the heating system or the cooling system.

From the two basic temperature control devices described above, numerous temperature control systems have been developed, offering different features and variations. The temperature sensing and control devices have moved from traditional bi-metal contractors to more sophisticated electronic devices as technology has advanced. Some modem systems have been developed to enable a user to conserve energy while controlling temperature comfort levels. One modem system, for example, may be programmed by a user with multiple desired temperature settings for activating both heating systems and cooling systems based on time-dependent user-programmed parameters, such as time of day, day of week, month, etc. Another system, called Smart Systems 1000™, sold by Smart Systems International, includes an infra-red motion sensor for sensing the presence of a person in the premise being controlled. The system controls the temperature differently when a person's presence is detected than in the absence of such detection, in an attempt to conserve energy when the premise is vacant.

Another system, called Transtext®, sold by Integrated Communication Systems, Inc. of Roswell, Ga., allows a user to select different desired temperature settings depending on which of three utility company energy cost tiers (high, medium or low) then is in effect, giving the user a certain level of control over energy consumption cost savings.

While such systems offer a certain level of energy consumption control and, therefore, energy consumption cost control, none provides a user with direct energy consumption level or energy consumption price level control. Additionally, none offers user-defined control of environmental conditions other than temperature, nor does any provide automatic environmental condition control based on sensed external environmental conditions, which external conditions may greatly effect internal conditions.

As the energy (i.e., gas, electric, etc.) supply industry becomes re-regulated and numerous energy suppliers become available to each premise, energy consumption control and price information (and control) will enable the savings of energy consumption and a tremendous amount of money spent thereon. A change occurring today in the energy and utility industry includes the movement of energy suppliers from a monopoly base to a competitive base, which movement will enable a user to select a supplier from an available group. Comparison shopping for the best price will be enabled. With the complicated pricing formats of most energy suppliers, and due to the dependence of total energy cost on usage times, energy levels, number of loads, etc., it will be quite difficult, from an accounting standpoint, for a user to predict cost and therefore take advantage of the selection opportunity.

It is a general object of the present invention to provide an environmental condition control system that automatically controls internal environmental conditions to optimize comfort and minimize energy consumption and/or energy cost, based on user-defmed parameters.

SUMMARY OF THE INVENTION

The present invention is directed to an environmental condition sensing and control system aimed at optimizing comfort and minimizing energy consumption and cost, based on user-defined comfort and cost level parameters. In its simplest embodiment, the system of the invention acts as a thermostat replacement to sense and control temperature. In a more elaborate embodiment, the system may form part of an overall energy management system, such as that described in U.S. Pat. No. 5,572,438, which is herein incorporated by reference in its entirety.

In one embodiment, the system of the invention would have the ability to sense an indoor temperature. In an enhanced embodiment, the system could sense at least humidity, outside temperature, UV intensity, wind direction and speed, relative humidity, wet bulb thermometer measurements, and dew point. The system also can accept and process inputs such as local weather forecast data, energy supply company pricing schemes, and user-entered parameters such as desired comfort levels and energy price cutoff points. Such sensed conditions and inputs are processed by a processor of the system, with software operating on the processor, to maintain environmental conditions and energy consumption level and cost within the user-defined levels.

In one embodiment, the system solely will manage indoor air temperature through the control of heating and/or cooling systems. In a more enhanced embodiment, the system will manage air quality and humidity through control of appropriate heating, filtration, conditioning and cooling systems equipment in conjunction with damper and fresh air input ducts, electrostatic filters and ionization devices. The system will manage its operation of the available environmental conditioning resources to maintain the optimum temperature, humidity and air quality conditions based on user-defined minimum and maximum values for comfort indices and price of energy indices. In a more elaborate embodiment, the system also has the ability to switch energy types, i.e., electric to/from gas for environment heating and the ability to switch suppliers based on the asking price of the energy suppliers or brokers serving the location.

The system of the invention balances environmental condition comfort with price and energy consumption management. In the absence of cost and energy consumption control input parameters, the system will maintain environmental conditions within user-defined comfort ranges. With such parameters, including environmental condition price-related preferences, price point cutoffs and historical energy consumption data, as well as energy supplier cost structure inputs, the system will alter environmental condition levels, as needed, to achieve the optimum environmental conditions, balancing comfort with energy consumption and cost control.

In an embodiment, to provide feedback to the user, the system will record the number of energy units (i.e., kilowatt hours, British Thermal Units [BTUs], Therms, and Joules) consumed as a function of time for each of a number of environmental condition controlling loads monitored and/or controlled by the system. The system will have the ability to report back detailed consumption data as a function of time and format the data in summary fashion to provide, at a minimum, daily averages for any user defined period, monthly totals, as well as track the costs of each energy unit consumed per period and provide detailed and average daily cost for any user-defined period as well as monthly totals. The system will be capable of controlling loads beyond its primary management function of the environmental air management systems, using, at least in part, the same economic modeling techniques and controls that it uses to manage its primary functions. It also will manage, report and track total premise energy unit usage and interface with energy unit suppliers via a communications channel. The system controls will be located at the premise, while the processors for modeling and managing the sources and types of energy units to be utilized and committed to, may be distributed and operate over a communications network without regard to the actual location of or distance from the premise. Such a distributed processor would be located on a reliable network so as to be capable of delivering the necessary controls to the premise in a timely and reliable fashion and to achieve the desired results.

One embodiment of the present invention is directed to an indoor environmental condition control and energy management system. It includes a user input that receives user input parameters including a desired indoor environmental condition range for at least one energy unit price point. An indoor environmental condition input receives a sensed indoor environmental condition. An energy price input receives a schedule of projected energy unit prices per time period. A processor, coupled to the inputs, computes an environmental condition deadband range for multiple energy unit price points based on the user input parameters, and controls at least one energy-consuming load device to maintain the indoor environmental condition within the computed deadband range for a then-current energy unit price point.

In one embodiment, the environmental condition includes at least temperature and the at least one load device includes a heating and cooling system.

In an embodiment, multiple deadband ranges may be selected by a user for different time periods.

In an embodiment, the system further includes a communications link through which the process communicates with at least one energy supply company and wherein the processor selects one energy supply company to minimize energy consumption cost.

In an embodiment, the system further includes an outdoor environmental condition input that receives a sensed outdoor environmental condition, and wherein the processor controls the at least one energy-consuming load device based in part on the sensed outdoor environmental condition.

In an embodiment, the processor may select between suppliers of different types of energy.

In an embodiment, the processor controls operation of the at least one load device to repeat a pattern of usage by the user over a time period.

In an embodiment, the at least one load device includes a plurality of energy-consuming load devices. In this embodiment, the processor monitors energy consumption by each load device.

In one embodiment, the processor communicates information to the at least one energy supply company. This information includes at least one of energy consumption data, energy usage schedule, cost information and account information.

In one embodiment, the system further includes a central processor, coupled to the local processor over a communications channel, for monitoring energy consumption at a plurality of premises.

In an embodiment, the processor monitors and controls each of a plurality of appliances based on user input parameters relating to usage of the appliances.

In one embodiment, the system further includes a mechanism, coupled to the processor, for controlling an on-premise energy-generating device to operate during periods of higher cost from an energy supplier.

In an embodiment, the processor controls the heating and cooling system to ramp up or down indoor temperature during certain time periods to reduce energy consumption costs.

In an embodiment, the system further includes a mechanism for receiving an indication of premise occupancy and wherein the processor computes a vacancy deadband range and an occupied deadband range.

In an embodiment, the system further includes a mechanism for activating an alarm when an extreme environmental condition is sensed.

An embodiment of the system is directed to an energy consumption management and environmental condition control system. A user input receives user input parameters including at least an energy unit price cutoff point and a desired environmental condition comfort range. An environmental condition input receives information relating to a sensed environmental condition. An energy supply company input receives energy supply company pricing information. A local processor, coupled to the inputs, controls operation of at least one energy-utilizing load on a premise to optimize an indoor environmental condition and minimize energy consumption costs, based on the user input parameters. The at least one load includes an indoor environmental condition control device.

In one embodiment, the at least one load includes a plurality of loads, the environmental condition includes temperature and the environmental condition control device includes a heating and cooling system.

In an embodiment, the local processor analyzes energy supply company pricing information and selects between multiple energy supply companies to minimize cost.

In an embodiment, the local processor monitors total energy consumption per a time period by all of the loads of the premise and by each load individually.

In an embodiment, the local processor records historical load energy usage and computes projected estimated energy consumption for at least one load based on the historical usage and the inputs.

In an embodiment, the system further includes a communication channel, coupled to the local processor, through which the local processor and at least one energy supply company communicate.

In an embodiment, the system further includes a central processor, coupled to at least one local processor through a communication channel, that monitors and controls energy consumption and cost for each premise including a local processor.

In an embodiment, the local processor selects an energy supply company based at least in part on projected estimated energy consumption to minimize future energy consumption cost.

In an embodiment, the local processor controls operation of each load individually based on user input and energy supply company input to minimize energy consumption cost.

In an embodiment, the user input includes an energy cost cutoff point for each of a plurality of loads. The processor controls each load to operate only until the energy cost cutoff point is reached for that load.

In an embodiment, the processor compares historical energy consumption with current energy consumption for at least one load and monitors the differences.

In an embodiment, the user input parameters include a desired temperature and minimum and maximum temperature levels for at least one energy price point. The processor computes a deadband temperature range for available energy price levels and controls the heating and cooling system to maintain an indoor temperature within the deadband range at a then-current energy price level.

In an embodiment, the user input parameters include multiple deadband temperature ranges for different time periods.

In an embodiment, the processor controls operation of the heating and cooling system to repeat a pattern of usage by the user over a time period.

Another embodiment of the invention is directed to an energy management system. It includes a plurality of local load controlling processors. Each local processor monitors energy consumption and controls operation of at least one energy-utilizing load to optimize an indoor environmental condition and minimize energy consumption cost, based at least on user input parameters relating to desired energy cost information and an environment condition comfort range. The at least load includes an indoor environmental condition control device. A central processor communicates with each local processor over a bus system and communicates with at least one energy supply company over a communications channel. The central processor analyzes energy consumption and cost for each local processor and selects an energy supply company for each local processor.

In an embodiment, some of the local processors are located on different premises.

In an embodiment, each local processor computes an environmental condition deadband range from multiple energy unit price points based on the user input parameters. The local processor controls the indoor environmental condition within the deadband range for a then-current energy unit price point.

A further embodiment of the invention is directed to a method for managing energy consumption and controlling an indoor environmental condition for a premise. The method includes the following steps: receiving user input parameters including a desired indoor environmental condition range for at least one energy unit price point; receiving a sensed indoor environmental condition; receiving a schedule of projected energy unit prices; computing an indoor environmental condition deadband range from multiple energy unit price points based on the user input parameters; and controlling at least one energy-consuming load device to maintain the sensed indoor environmental condition within the computed deadband range for a then-current energy unit price point.

In an embodiment, the method further includes the steps of monitoring energy consumption for each of a plurality of energy-consuming load devices and controlling operation of each load device to maintain energy consumption cost within a desired user input cutoff point.

In an embodiment, the method further includes the step of selecting an energy supply company to minimize energy consumption costs.

BRIEF DESCRIPTION OF THE DRAWING

For a better understanding of the present invention, reference is made to the accompanying drawings, which are incorporated herein by reference.

DETAILED DESCRIPTION

The present invention includes an internal environmental condition control system that automatically controls internal environmental conditions to optimize comfort and minimize energy consumption and/or energy cost, based on user-defined parameters or default parameters. In a simple embodiment, the invention includes a thermostat replacement which controls internal temperature based on user-defined comfort levels and/or energy price cutoff points. In an alternate, and more elaborate, embodiment, the invention may form part of an overall energy management system capable of controlling numerous internal environmental conditions through multiple devices and optimizing energy cost and consumption through automatic energy supplier selection and other cost management functions, as will be described below.

Figure 1:
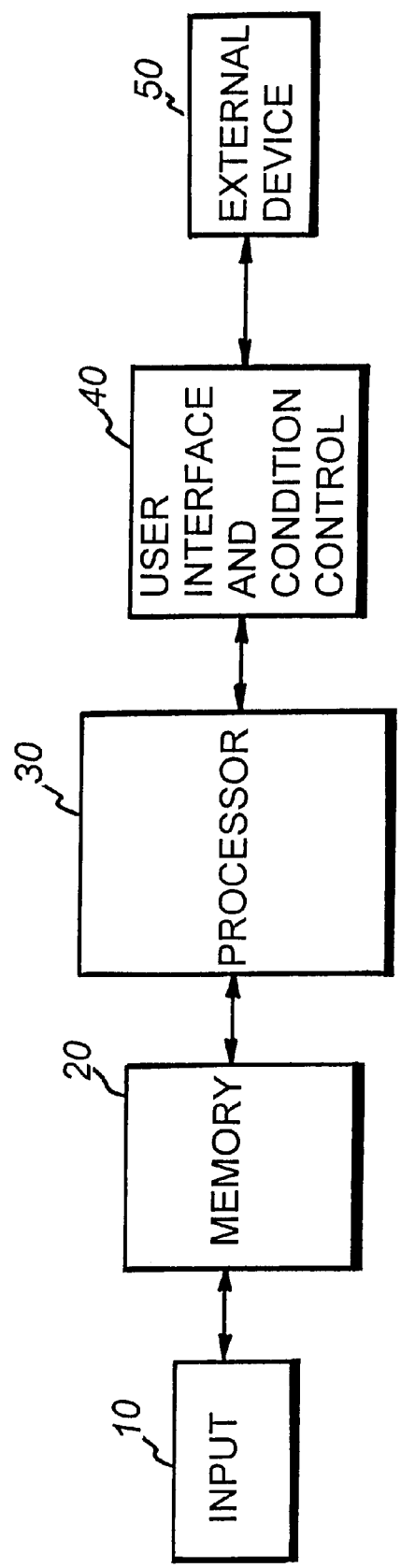
FIG. 1 is a general, structural block diagram of an embodiment of the system according to the invention.

FIG. 1 is a block diagram showing the basic hardware components of the system of the invention. As shown, the system includes at least one input device 10, a memory 20, a processor 30, a user interface and device control block 40 and an external device 50. Input device 10, which may receive an input from a keyboard, mouse, microphone, telephone, external sensor or other, may receive user-provided or non-user-provided input. As will be described in greater detail below, user input may include temperature and other environmental condition comfort ranges as well as timing and pricing preferences. Non-user input may include sensed environmental conditions such as temperature and humidity as well as energy supplier cost information.

The input received by input device 10 is provided to memory 20 where it is temporarily stored. Memory 20 may include any type of electronic or computer-related data memory such as Dynamic Random Access Memory (DRAM).

The data stored in memory 20 is accessed and processed by processor 30, which may include a microprocessor, personal computer, or other type of processor capable of data manipulation and signal processing functions such as arithmetic calculations. Numerous different environmental condition control, price and energy consumption control and cost prediction functions may be provided by the system of the invention, as described below, which functions require processing on the part of the processor. The functions may be selected by a user and the processing is carried out by processor 30 implementing software routines. One such function includes controlling the temperature within a premises to remain within user-inputted maximum and minimum temperature comfort points and/or energy cost cutoff points.

The memory and processor may constitute a general purpose computer, such as a personal computer. The input, memory and processor all may connect to a common bus (not shown) on which data is communicated between the elements (from input to processor, processor to/from memory, etc.).

Processor provides output signals, in the form of digital, analog, mixed signal, or other, to user interface and external device control block 40. User interface and external device control block 40 may include separate devices, including, for examples, a display device, which displays information to a user, and a control device, which controls an external environmental condition control device 50 by providing a control signal or signals to such external device 50.

One or more energy-consuming external devices 50 (loads) are controlled to maintain desired levels of environmental conditions while minimizing energy consumption. External devices 50 may include, for examples, heating systems, cooling (i.e., air-conditioning) systems and/or other environmental condition controlling external devices, such as heating, ventilation and air conditioning [HVAC] systems.

Not shown in FIG. 1 is a communications channel through which the processor communicates with energy supply companies to receive future energy unit price schedules. As described below, based at least on user input parameters and price information, the processor will select an energy supplier to minimize energy consumption cost.

In one embodiment of the invention, as will be described in detail below, a user will input a desired temperature range for at least one energy unit price point and the processor will compute a deadband temperature range for all possible energy unit price points (received from energy supply companies). The processor then will control a heating and cooling system to maintain an indoor temperature within the deadband range for each then-current energy unit price point.

Figure 2:
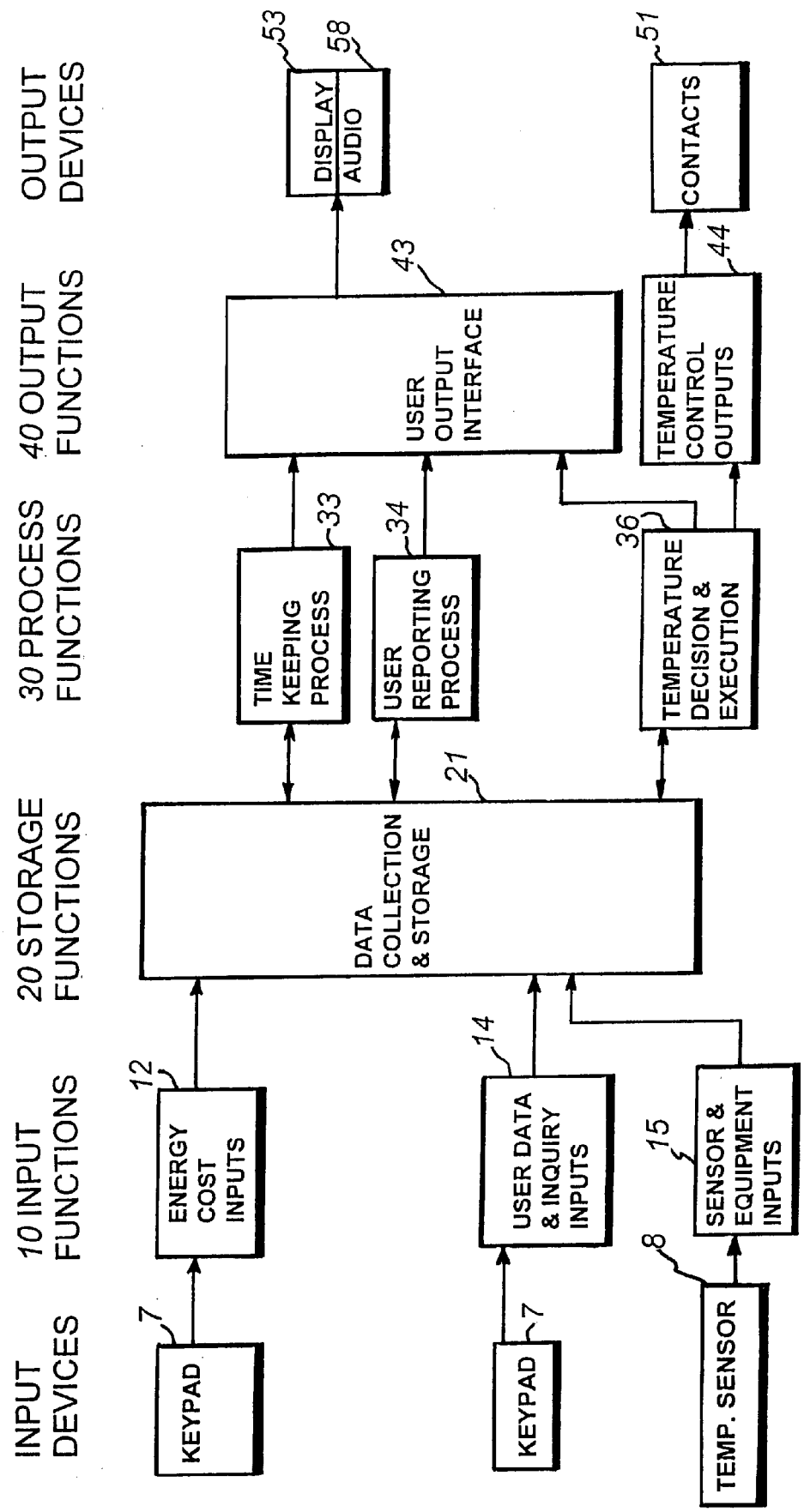
FIGS. 2–4 are part structural, part functional block diagrams of different embodiments of the system of the invention.
Figure 3:
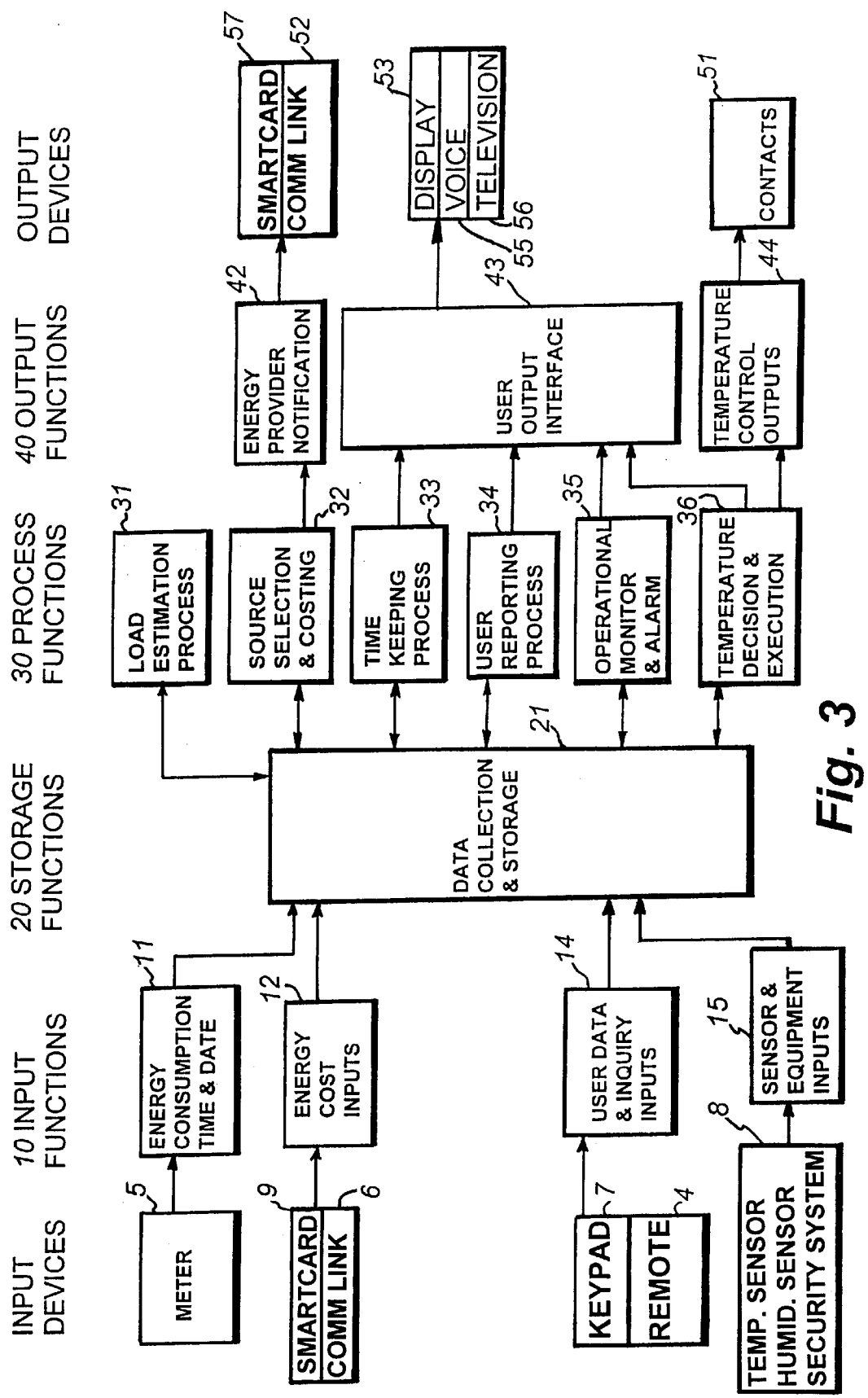
Figure 4:
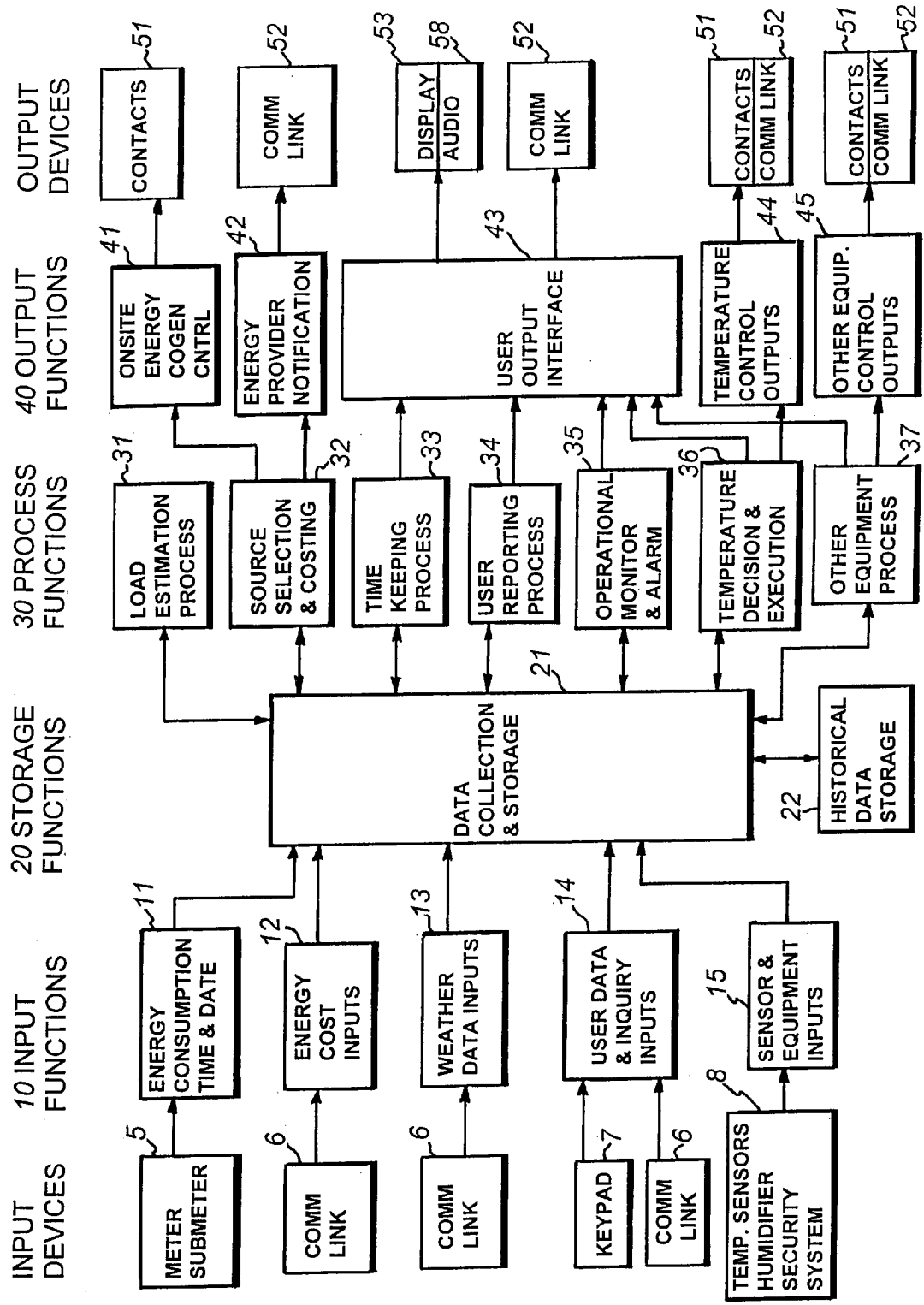

Different embodiments of the invention, shown in FIGS. 2–4, range from simple to elaborate, in terms of the number of features and functions offered. Each of FIGS. 2–4 is a part functional, part structural block diagram illustrating the functions performed by, and the input and output elements of, the system. Each of the embodiments of FIGS. 2–4 includes at least the basic general hardware elements shown in FIG. 1, with specific, exemplary input and output devices shown in each of FIGS. 2–4 for use with each system. For ease in understanding, the numbering of the functional blocks in FIGS. 2–4 remains consistent with the numbering in FIG. 1 of the corresponding hardware elements for performing those functions. Input-providing devices 5–9 are shown in FIGS. 2–4. While input receiving device 10 is shown in FIG. 1, input functions 11–15 are shown in FIGS. 2–4. While memory 20 is shown in FIG. 1, data collection and storage functions 21 and 22 are shown in FIGS. 2–4. While processor 30 is shown in FIG. 1, processing functions 31–37 are shown in FIGS. 2–4. While user interface and external device control block 40 is shown in FIG. 1, output functions 41–45 are shown in FIGS. 2–4. Controlled output devices 51–58 are shown.

The specific input hardware devices and output hardware devices shown in FIGS. 2–4 are exemplary and are not intended as limiting. Any input devices that provide the required inputs and output devices which may be controlled to provide the noted functions may be used with the system of the invention.

Each of input functions 11–15, storage functions 21, 22, processing functions 31–37 and output functions 41–45 is described separately below. Each embodiment of the invention, shown in FIGS. 2–4, includes different combinations of such functions, ranging from the simplest (with the least functions)-shown in FIG. 2, to the most comprehensive (with all functions)-shown in FIG. 4.

Figure 6:
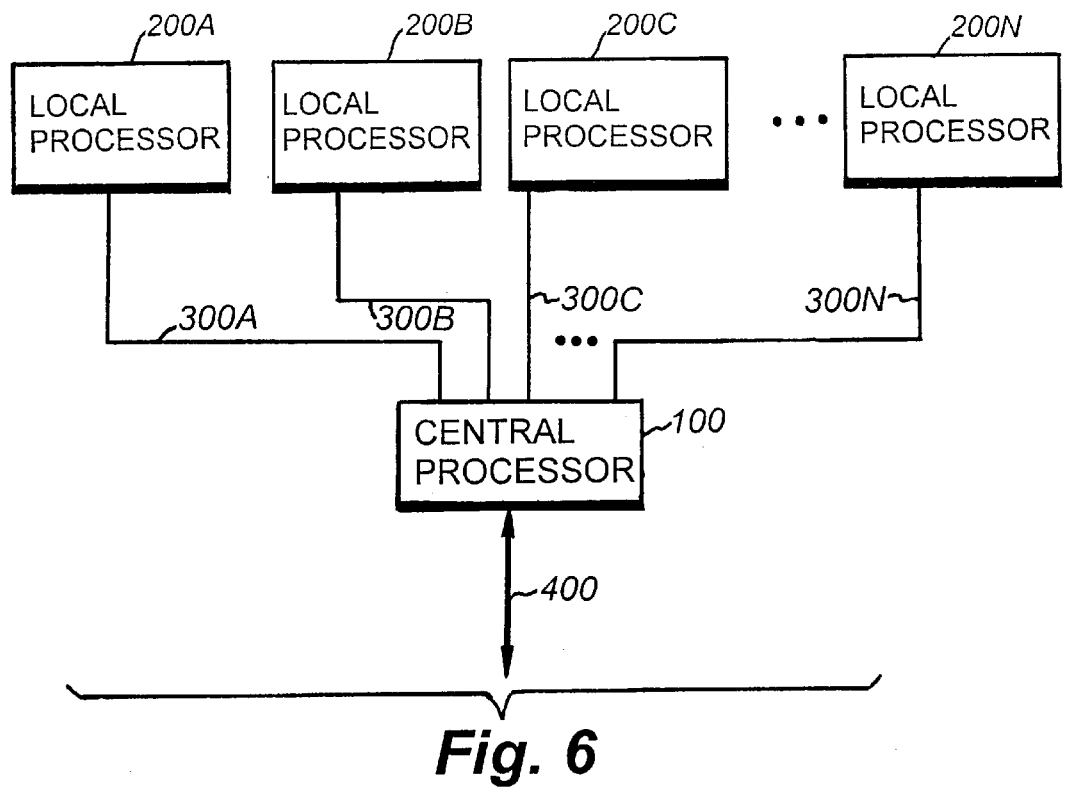
FIG. 6 is a block diagram of an alternate embodiment of the system according to the invention.

FIG. 6 is a block diagram of an alternate embodiment of the invention including a central processor 100 and multiple local processors 200A–200N. The central processor 100 communicates with each local processor 200A–200N over a multidirectional bus 300A–300N, respectively. Central processor 100 also communicates via communications channel 400 with energy supply companies.

Each local processor 200A–200N operates as described with respect to FIGS. 1–4 for monitoring and controlling indoor environmental conditions and load devices for maximizing comfort and minimizing energy consumption costs. Each local processor may be located on a different premise.

Central processor 100 monitors energy consumption and cost at each premise by receiving data from each local processor. Central processor 100 receives pricing information from energy supply companies and may select an energy supply company for each local processor as an aggregate cost saving measure.

Figure 7:
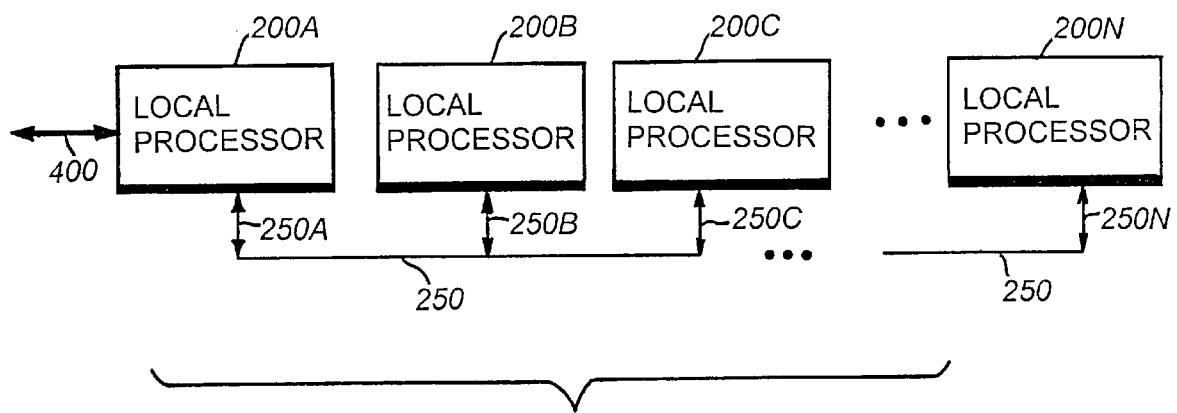
FIG. 7 is a block diagram of another alternate embodiment of the system according to the invention.

FIG. 7 is a block diagram of an alternate embodiment of the invention including multiple local processors 200A–200N. A main processor 200A communicates via communications channel 400 with energy supply companies. Each local processor 200A–200N communicates via a local communications channel 250 with each other local processor, including main local processor 200A.

Each local processor 200A–200N operates as described with respect to FIGS. 1–4 for monitoring and controlling indoor environmental conditions and load devices for maximizing comfort and minimizing energy consumption costs. Each local processor may be located on a different premise or in a different location on the same premise.

Main local processor 200A monitors energy consumption and costs for its own premise and in aggregate for each premise, as monitored by the other local processors 200B–200N, by received data from each other local processor 200B–200N. Main processor 200A receives pricing information from energy supply companies and may select an energy supply company for each local processor as an aggregate cost saving measure.

Input Functions

Input functions condition and convert input device information to data usable by the system. Each input function will provide all the necessary support for each input device to provide data reliably and accurately. Hardware may include analog signal conditioning circuitry for a sensor, scanning logic for a keypad or a protocol stack for managing a communications link.

Input Function 11

Input function 11 provides energy consumption and time and date information to function 21. The data may be obtained from any of a number of sources by methods such as by scanning keys of a keypad 7 for closures, decoding Dial Tone Modulation Frequency [DTMF] from a phone input, reading an energy meter 5 or submeter though counting pulses or communicating over a communications link 6. Multiple input devices can be supported. The collected data will be normalized in pulse count to units of energy consumed. It is then passed to function 21 for short term storage and data considered of historical importance can be stored in function 22 for long term storage. Time and date may be available from certain meters and if available would be collected and provided to function 21 which in turn would provide it to function 33.

Input Function 12

Input functions 12 provides energy cost information. Data can be collected from: a keypad through scanning keys for closures, decoding DTMF from a phone input, reading a Smart Card's 9 rate tables or communicating over a communications link either directly with one or more energy providers or with an energy cost service provider. The data will be collected and provided in a standard digital or analog format to function 21 for short term storage. Each energy provider will have its rate tables identified and can have other factors included such as the length of time the tables are valid, discounts for the length of time the service is continuously used and penalties for excessive energy usage during certain time periods. The rate tables themselves may embody any type of pricing structures such as flat rate, time of day, price tiers, etc.

Input Function 13

Input function 13 provides weather information. This information can be provided by keypad input, decoding DTMF from a phone input or through a communications link. The data can come from either an energy provider or a weather service provider. The data can be in the form of discrete parameters representing temperature, humidity, wind speed and direction or a weather index value suitable for use in calculating the effect of weather on cooling or heating a premise. The data may be provided at regular intervals and be sufficiently localized for acceptable accuracy. The information will be placed in a standard digital or analog format and passed to function 21. Data considered of historical importance can be stored in function 22 for long term storage.

Input Function 14

Input function 14 interfaces with the user to allow for data input and inquiries. Data can be entered by any standard data input device such as keypad input, decoding DTMF from a phone input, analyzing voice input from a telephone or microphone, a handheld remote control device or a communication link when the user is not local to the system. The data can include temperature set points, comfort levels, cost goals or strategies, operational commands and inquiries about costs, operation or status. In one embodiment, the data includes a maximum temperature level and a minimum temperature level for each of a number of energy unit cost points. The data also may include a maximum cost level for each of a number of energy-consuming loads above which cost level the user desires the load be turned off. This input is passed to function 21 for permanent storage.

Input Function 15

Input function 15 provides for interfacing with sensors and equipment as well any other data sources that may be appropriate such as a Smart Card 9 or communication link 6. Sensor types supported will sense internal and external environmental conditions including temperature and humidity, as well as other conditions such as occupancy. These sensors can provide either raw signal levels which will be converted to a standard readable data format or themselves provide data output which may be formatted and stored for use. Equipment that can effect the environmental conditions of the premise also will provide input to this function. Types of equipment can include humidifiers, dehumidifiers, air filters, dampers and air ionization devices. The data they will provide can include status, state, alarm and level. Function 15 will pass all collected data to function 21 for storage and use by other functions.

Storage Functions

Storage functions provide short term, long term and permanent storage of information provided by Input and Process functions. Short term storage encompasses data stored for one calculation or from one hour to 90 days. Long term storage can be from one to two years or longer. Permanent storage is data that once stored is never discarded or changed except by the user. In terms of relative size, short term storage may store kilobytes, long term storage may store megabytes and permanent storage may store hundreds of bytes. Data will be written by input functions and written and read by process functions.

Storage Function 21

Storage function 21 collects all data and provides short term and permanent storage. All implemented input functions collect data from input devices, format the data and pass the data to function 21 for storage. All active process functions retrieve data from storage, then process and store results in function 21. A process can decide to delete or modify any stored data not shared among multiple processes and can determine what data has historical value and will be used in the future and tag it for long term storage. Function 21 would move such data to long term storage if available and retrieve that data when requested by a process. Data shared among multiple processes that was not overwritten by new input data would be tagged by each process as deleteable when no longer useful and be deleted when all sharing processes had tagged it so. Examples of data types include user preferences and limits, which may be permanent data, energy rate tables and sensor inputs, which may be short term data, and consumption profiles and weather data, which may be short term data. Short term data having historical value may become long term data.

Storage Function 22

Storage function 22 stores all long term data. It receives data from function 21 and stores it for a year or more, in one embodiment. This function may be local to function 21 or remote from it and the connection between the two functions can be a hardware connection or a communications data link. It is possible that this function be implemented in a personal computer or as an added memory storage unit or as a separate service provider computer system.

Processing Functions

Process functions use collected and stored data to make decisions and provide results. The functions are carried out by operating software on a processor (such as that of a general purpose computer). The results may be provided as output to the user or other processes within the system or through output functions to output devices, service providers or external equipment. Connections between processes and storage or output functions can be within the same microprocessor or physically separated by great distances and connected through a communications data link. As such, a process can be performed by a remote computer system or by a service provider and sent back to the local system to output functions.

Process Function 31

Process function 31 provides a load estimation process, predicting future energy loading for other processes and for energy providers which will need to obtain customer-provided information to manage future load requirements. Function 31 will track usage by reading function 11 meter input data, if available, and track the effect of weather by reading function 13 weather input data, if available. Based on available data, function 31 will provide a load estimate for the subsequent day, week or month. Historic data will be used if available in long term storage. If no data is available, then this function will be dormant. Load estimates will be stored in function 21 and provided to the selected energy provider once chosen and also used in the form of load profile and energy consumption data to make that selection in process 32.

Process Function 32

Process function 32 selects an energy type, energy provider and pricing format, assuming multiple are available. The user may have available, more than one energy supplier, more than one type of energy, and may have local private energy generation or 'cogen' capability. Decisions then can be made regarding energy type, energy supplier and if and when cogen is to be utilized to realize cost savings. Decisions will be made with user-specified criteria and possibly based also on predicted future uses, historical usage patterns, weather patterns or forecasts, etc. Function 32 would read cost and user input data collected by input functions 12 and 14, and load and time data from process function 31 and 33 to make those decisions. Absent user-specified criteria to the contrary, the selections will be made to minimize cost. If there is no function 12 data, then the entire process will be dormant. Similarly, if there is no cogen capability or multiple energy types as indicated by function 14, then those portions of the process will be dormant. Similarly, if there is cost data for only one supplier, then the selection process will default to that supplier. If user criteria data is not provided, then a default set will be used until such time as that data is provided. If there is no load information from function 31, then selection will be made on the lowest rate for each hourly interval. Results of this process will be provided to output functions 41 for cogen control, if available, and to function 42 for energy provider notification of selection. This notification may be by a Smart Card or through a communications link, as defined by function 42.

The costing process uses inputs read in function 21, the consumption data from function 11 and the selected energy supplier's rate table data from function 12 to determine cost for storage in function 21 and to provide energy consumption data to the energy supplier, provided no automatic meter reading system or service is available to the supplier. Consumption data will be available from function 42.

Process Function 33

Process function 33 provides time, date and day of the week data. This process can be synchronized to the energy supplier's reference if input function 11 can collect this data from the energy meter. It will otherwise be set by the user. This process will provide local time, date and day of the week data and store it in function 21 for any process to use and is directly provided to the output function 43 for immediate display, if available.

Process Function 34

Process function 34 provides a user-reporting process in response to user inquiry. The process collects data from function 21 and passes a response to function 43 to present to the user based on an inquiry input from function 14. A set of defined inquiries will be made available to the customer. A selection can be inputted by the user. Function 34 will collect and format data for presentation based on that selection. Examples would include: present temperature, temperature set point, present supplier, present cost this hour, cost to date this month, present consumption profile and present user selection criteria. These responses are subject to availability of the data within function 21.

Process Function 35

Process function 35 provides a system monitoring and alarm process. All other functions will report their statuses to this function. If any function detects a problem or malfunction, then it will be reported to function 35 which will store the status in function 21 and report the problem directly to function 43 for user notification. Examples include reporting data no longer available for previously operating process, out of memory and temperature not responding to control. Additional interaction between output functions and input functions where feedback is expected will be monitored and used to determine if proper operation of external equipment is occurring. This information also will be stored and reported as required. Over time, this ability to monitor, measure and store the operational level of external equipment will allow for predictive reporting by function 15 as to the need for maintenance to restore the efficiency of that equipment.

Process Function 36

Process function 36 provides at least the basic thermostatic control and, with enhancements, can be used optionally to improve user comfort while reducing cost. On a continuous basis, function 36 reads function 21 for sensor and equipment inputs from function 15, user data from function 14, rate tables from function 12, based on the energy supplier selection performed by function 32, and time and date data from function 33, as available. Based on the data, a set point temperature variance is determined to provide the proper control to meet user requirements. Optional features implemented in function 36 include ramping, preheating and precooling, as described below. These options further vary the set point to improve user comfort while controlling cost. A direct output is provided to function 43 to provide the user immediate access to temperature data. As described below, a user may enter a minimum and maximum desired temperature range for at least one energy unit cost point. The function then will compute a comfort deadband range for all possible energy unit cost points. The system then will monitor the temperature and the energy unit cost and will maintain an indoor temperature within the computed range. As described below, the range may be greater as the cost of energy increases, thus automatically providing the user with cost savings by altering the indoor temperature range.

Process Function 37

Process function 37 provides for control of other environmental equipment to further improve user comfort and control cost. Function 37 reads cost information data from function 12, weather data from function 13, user data from function 14 and equipment data from function 15, etc. Depending on the type of equipment and control provided over that equipment, function 37 can provide cost savings by operating the equipment during lower energy cost periods, as opposed to set times of day, as may be necessary with air filters and ionization devices. Humidifiers and dehumidifiers can be controlled to enhance cooling or heating cycles where a cost savings can be calculated. The devices are monitored for energy consumption and each may have different usage requirements (i.e., time of day, weather-dependent, etc.) as specified by the user. The state of the control of the equipment is available directly to function 43 for immediate display.

Output Functions

Output functions control and provide data to output devices, communication links and environmental equipment. Output functions, for example, control external devices to maintain an environmental condition within a comfort range while minimizing energy consumption by the external devices. Each output function will provide all the necessary hardware and functional support each output device and controlled external device requires to function properly and reliably. Such support may include, for examples, contact closures, certain signal levels, audio capabilities, data display capabilities and the ability to format information and data over communications links controlled through a protocol stack for managing the data flow and integrity.

Output Function 41

Output function 41 provides the control to initiate local energy generation or cogen. Function 32 will make the determination that cogen is the energy of choice to function 41 which will then use contact closures or a communication link 52 to initiate the process. Function 32 also will determine the end of the cogen process and signal function 41 to turn off cogen. The system will not provide for the direct control of the energy generation process but control only the on and off states.

Output Function 42

Output function 42 provides notification to the selected energy supplier of its selection and can provide consumption data if necessary. It can also notify those energy suppliers with which the user has a relationship that they have not been selected for a specific time interval. Function 42 will support a communication link and messaging to the energy suppliers. It also will support storing this data in a Smart Card 57 for non-real time reporting. Consumption data, when there is no automatic meter reading system or service, can be provided to the energy supplier through the same means as the selection process.

Output Function 43

Output function 43 provides data and display formatting support for the user output interface. This function can be implemented with a variety of output devices including: Liquid Crystal Display [LCD], Light Emitting Diode [LED], Vacuum Florescent [VF], Field Emissive Display [FED] or Cathode Ray Tube [CRT] displays 53; a voice response subsystem using a phone or speaker 55; a tactile output device like an electromechanical Braille pad; a television channel 56 added through a cable, satellite or other type of set top box and a variety of communication links. The user output interface may be provided with data directly from process functions 33 through 37 for immediate access without an inquiry. All other data is accessible through an inquiry processed by function 34. Additional indicators or enunciators may be implemented for providing statuses of certain functions such as power on, equipment state and alarm.

Output Function 44

Output function 44 provides control for heating and cooling equipment. Function 36 will determine the need for heating or cooling and signal function 44 to initiate the process. Contact closures, similar to standard thermostats, may be used to control the heating or cooling of the premise. A communications link 52 also may be available to communicate to equipment remote to the system.

Output Function 45

Output function 45 provides control of environmental equipment other than that controlled by function 44. This equipment may include humidifiers, dehumidifiers, air filters, dampers and ionization devices. Function 37 will determine the need to turn on or off a specific equipment type and signal function 45 to initiate the process. Contact closures 51 will be used to control these units. A communications link also will be available to communicate to equipment remote to the system.

Output Devices

Output devices 50 are those devices that accept input from the output functions of the system. These devices will interface with the appropriate output functions which will provide the proper control to those devices in response to the requirements of the system. Not shown are the specific external devices, including energy-consuming load devices, controlled by the system of the invention. The load devices may include environmental condition controlling devices such as heating or cooling systems, humidifiers, or the like, or any energy-consuming device to be monitored and controlled by the system of the invention. The controlled load devices will receive control inputs through power modules, directly from the processor, from any of the output devices, or other.

Contact Output

Dry contact closures 51 will be used to provide control to devices outside the system from functions 41, 42, 44 and 45. These contacts will be rated for controlling relays and low voltage circuits. The contacts may, for example, control the external load devices for energy consumption management and environmental condition control.

Communications Link Output

This link 52 is similar to that described in the Input section except that the direction of the information would be out from the system. The described links, regardless of the physical communications channel media, can be full duplex, half duplex or simplex, as dictated by the nature of the link and the needs of the input functions and output functions 41 through 45. Examples include: Satellite which is simplex and normally only supports input functions, Ethernet which is half duplex but will support both input and output functions, and phone lines which are full duplex and always supports both functions.

Display Outputs

A display 53 device capable of providing readable data of various forms and types to function 43 may be employed. The display can be textual or graphics based and have sufficient display area to convey the required information. The construction can be custom or standard and be of any technology appropriate for the specific implementation such as LCD, LED, VF, FED, plasma, CRT and may be electromechanical, visual or tactile, such as a Braille pad. The display also may incorporate a number of individual indicators or enunciators of various technologies which provide status information such as power on, equipment state and alarms.

Audio Output

An audio output device 58 may be used to indicate and alarm state for function 43 to inform the user that a malfunction or limit has been reached. It also may provide feedback to a user during data input to indicate acceptance or that a change has been instituted. Device types can be either sound-generating or transducer-based and may produce one or more sounds. These sounds may be tones or sound effects. Any of speakers, buzzers, bells and piezoelectric devices may be used for this purpose.

Voice Output

A voice output device 55 may be used as an output for function 43 to inform the user of the status or state of the system in response to an inquiry or command. This would function in a fashion similar to voice response systems and can be used remotely over a phone line as well as locally within the premise. Previously stored or user-recorded messages would be used to provide the voice response to user input or inquiry. Examples include stating the selection made through a phone keypad input, providing the temperature of the premise and announcing an alarm condition.

Smart Card Output

As previously described in the Input section, a Smart Card 57 also may be used to output information from function 42. It can store energy consumption and other information that would be provided to the energy or service provider or providers through some means dependent on the deployment method used in conjunction with a Smart Card. As an example, a Smart Card could be brought to a facility which uploads a payment transaction to the card and downloads the consumption data from it to provide to the energy provider. This can also be done on premise through a device with a phone line modem and Smart Card interface.

Television Output

A television 56 can be used an output device for function 43 and can incorporate both visual and audible outputs. The audible output may be similar to a voice output device except it would be modulated onto the television channel audio carrier. The visual output may include any display device except it would modulated onto the television channel video carrier. Due to the capabilities of television, enhancements to the audio and visual outputs can be implemented to take advantage of those capabilities. Examples include adding graphical images to output responses, displaying detailed graphs of consumption or other available data and adding TV channel-like presentations. The connection to the television can be through an RF channel, audio/video inputs, a secondary communication link or a set top box interface.

Features

The following is a discussion of features provided by the systems of FIGS. 2–4. Each system provides a different number of the discussed features, as noted.

In each of the embodiments of FIGS. 2–4, a VARIABLE DEADBAND COMPUTATION will occur in which a variable deadband temperature range will be computed for each of a number of possible energy unit price points, based on user input data. The system then will control a heating/cooling system to maintain an indoor temperature to be within the deadband range for the then-current energy unit price point.

Figure 5:
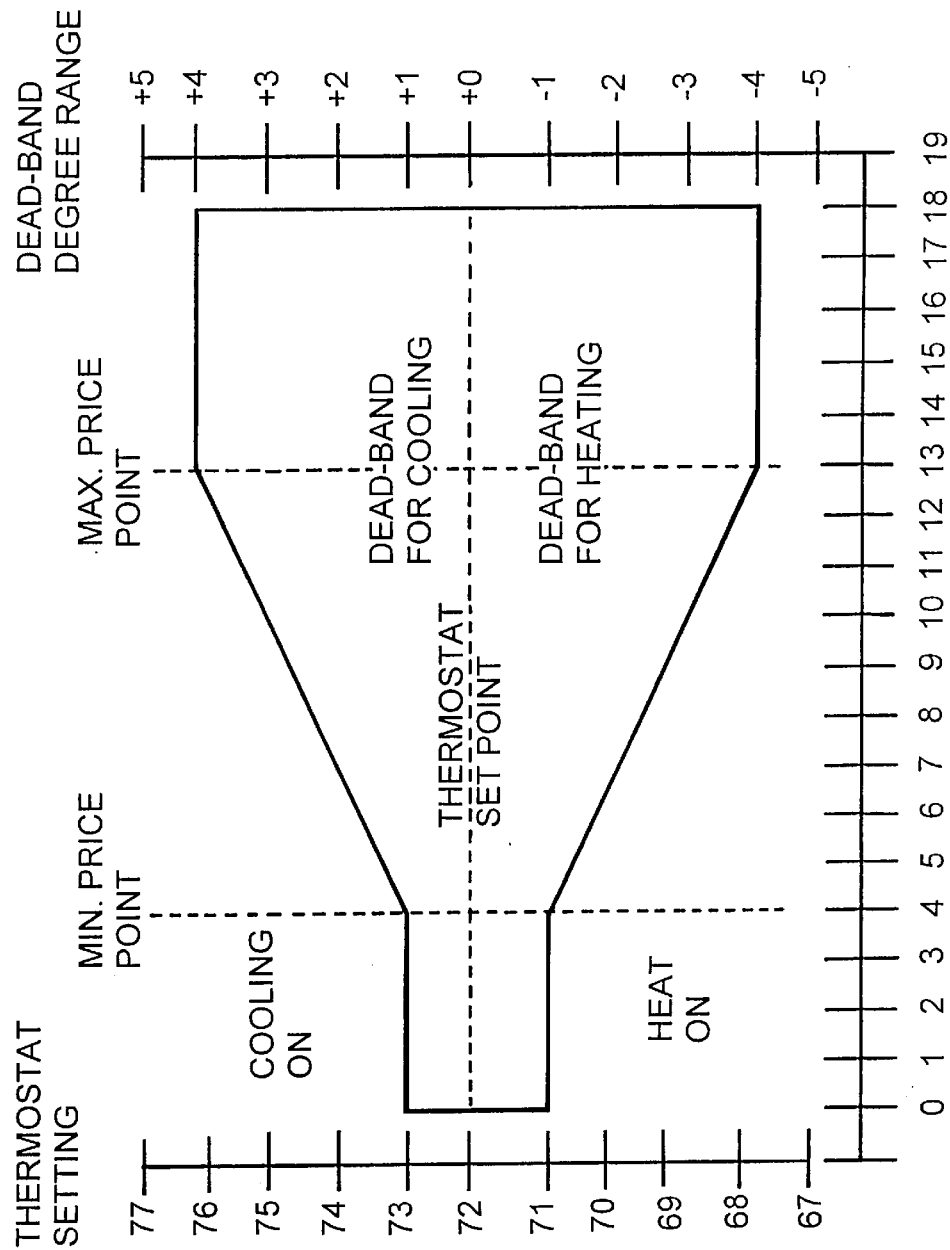
FIG. 5 is a graph illustrating a deadband temperature range computed according to the invention.

Referring to FIG. 5, the occupant would select a specific ideal temperature and a range above and below the ideal temperature within which they would like the system to maintain the indoor air temperature. This range may be entered for different energy unit price points and may differ depending on the price. For example, the occupant might choose an ideal temperature of 72 and a + or −1 degree range given a cost per unit of energy of less than or equal to 4. This setting would instruct the system to maintain an ideal setting of 72 degrees but would allow the system the flexibility of raising the temperature to 73 degrees or dropping it to 71 degrees.

The occupant would have the option of entering any number of cost points and variables which the system would then use in managing the temperature. [FIG. 2 feature of MANUAL COST ENTRY with the user notifying the supplier and FIG. 3 feature of AUTOMATIC COST ENTRY and AUTOMATIC SUPPLIER NOTIFICATION with a communications link.] This system also permits the use of a fixed set point option where the occupant would specify a desired specific set point but not have the option of directly modifying it. [FIG. 2 feature of enabling DATA ENTRY PASSWORD.] This might be the case for example in a commercial facility or in the case where an energy provider or bill payer offer specific fixed set point programs to occupants as part of a fixed price energy use program or under a contract with the occupant as part of an energy management offering.

If the user does not enter any cost points or variables, the system will operate as any other thermostat by maintaining the temperature within the range specified by the occupant. However, in a re-regulated environment, multiple suppliers of energy may be available to the occupant and therefore, the user would have the ability to enter bid prices for energy into the system which would specify the maximum amount the user was willing to pay for a unit of energy and associated with that bid price, the dead-band variance they were willing for the system to manage the temperature within at that bid price. [FIG. 2 feature of COST BASED COMFORT CONTROL.] Under the fixed set point option above, the price points and dead-band variance might be specified by the occupant or might be specified as part of an energy program or service contracted for by the occupant. These variables under the fixed set point option may not be controllable directly by the occupant. [FIG. 2 feature as part of feature 2.]

As an example, the occupant has defined a desired temperature setting and range of fluctuation (72 degrees + or −1 degree). The user then could enter a bid price that he/she is willing to pay to maintain that ideal setting and fluctuation range or dead-band. Alternatively, the user could enter minimum and maximum desired temperatures for each of a number of different costs per unit of energy. For example, as shown in FIG. 5, the user may enter a range of + or −4 degrees for a cost per unit energy of 13 or greater. The system then would compute the deadband range based on the user input parameters. A linear deadband range may be computed between the two entered points (costs per unit energy of 4 and 13 in this example). For a then-current cost per unit energy, which is monitored by the system, the system then would control a heating system and a cooling system to maintain the indoor temperature within the computed range. The heating system would be controlled to operate when the temperature falls below the deadband range. The cooling system would be controlled to operate when the temperature raises above the deadband range.

The system would be capable of using the same range of temperature dead-band for both heating and cooling, or would be capable of maintaining separate ranges for each. [FIG. 2 feature of TEMPERATURE RANGE input.] An example might be that a person who is more tolerant of cold than heat, might set the dead-band for heating at 8 degrees off of the set point for a given price of an energy unit, while specifying only a 4 degree dead-band for the same energy unit price point for cooling. An additional feature of the system would provide for the entry of a maximum and minimum actual temperatures within which the system is to manage the indoor air environment above or below the set point of the thermostat. [FIG. 2 feature of TEMPERATURE HI/LOW input.] Under this option, the user might enter 78 degrees as the maximum and 64 degrees as the minimum comfort range they would like maintained. The system would then utilize the current set point of the thermostat in conjunction with the minimum and maximum price and temperature inputs to compute a dead-band variance operating zone for the premise. This computation would be performed every time the set point or minimum and maximum price or temperature parameters are entered or modified. In addition, under this fixed minimum and maximum temperature option, the system would accept a set point greater than the maximum or less than the minimum temperature parameter in its memory and would use it as an override to these minimum or maximum parameters. [FIG. 2 feature of TEMPERATURE SET POINT input.] This override would negate the dead-band option for either the heating or cooling cycle depending on which degree setting was over ridden.

An additional feature of the system provides an option for supplying the system with the previously mentioned minimum and maximum degree settings for comfort along with an indicator for pricing that simply indicates at the lowest possible price. This feature permits the system to operate within the minimum and maximum degree settings without a minimum or maximum price. Under this scenario, the system would scan the available pricing for the upcoming day and use the lowest priced energy units per time period (i.e. per hour) to create a dead-band plot for the day using the cheapest price period as the set-point price and the most expensive price period as the greatest variance set-point price. [FIG. 2 feature of COST CONTROL LEARNING.] It then would operate within that dead-band range for the day or other defined period, or until new pricing for the time periods covered were received. If new pricing points are received, then the process will re-compute the dead-band plot for the day. Under this scenario, it is also possible to enter only a minimum or maximum price point into the system. Entering just the minimum would define at what price for energy units the system is to maintain the minimum dead-band variance and that plotting higher price periods will define the maximum for the day or other defined period. [FIG. 2 feature of COST CONTROL LEARNING.] Entering just the maximum will permit the use of the system shut down option if energy unit prices exceed those specified as the maximum 2 feature of COST CONTROL LIMIT SHUTDOWN.]

The historical data stored in an enhanced version of the system could be used to assist in making this decision, or could be used to automatically determine the optimum settings, since the system, after being installed for a period of time, will have sufficient history data in its memory to provide the average consumption analysis data such as energy units used and cost of the energy units as a function of time, temperature, occupant changes in the set point and weather related factors for normalization. [FIG. 4 feature of HISTORICAL CONSUMPTION ANALYSIS.] This energy usage signature of the premise environmental temperature air management system is used to manage the economics of its ongoing and future predictive operational costs as well as to track its operational characteristic from the standpoint of detecting abnormalities in energy consumption or run times based on its historical energy use and operational characteristics signature. [FIG. 4 feature of HISTORICAL OPERATIONS ANALYSIS.]

Based on these historical averages, the also may enter a maximum range and/or dead-band that they are willing to tolerate either in the form of an offset to the set point or an actual minimum or maximum degree setting and a maximum price cutoff that the system is to work within while managing both the economics and the environmental comfort conditions.

Associated with the maximum price and dead-band variance, the user would have the option of specifing to the system how it should react to prices higher than the maximum price specified. These choices would be to maintain the indoor air temperature at the maximum dead-band setting, or to activate an alarm condition and shut down the system until the energy unit price drops within the allowable range, or the allowable range is changed to accept a greater energy unit price. [FIG. 2 feature of COST CONTROL LIMIT HOLD.] These choices could be different for heating versus cooling, permitting the option, for example, of shutting down the system for cooling and initiating an alarm if the maximum price point is exceeded while continuing heating operations even when the maximum price point is exceeded. To illustrate how this would work, referring to FIG. 5, the user might enter a maximum cost per unit energy of 13 above which the dead-band range is 4 degrees + or −. The system then would compute internally the variable dead-band as a function of energy unit cost. The system then would then scan the available energy suppliers ask price table for the current price of energy and, based on the occupant-supplied data, would select the lowest cost energy source and supplier in an effort to remain as close to the user-defined comfort set point and spread as possible.

In this example, if the occupant had chosen not to enter any other than the original set point of 72 degrees and range of + and −1, then the system would choose the lowest energy unit cost and supplier and operate the heating and cooling system to maintain the indoor air temperature at the 72 degrees + or −1 degree default. If a minimum price was entered by the occupant and the lowest cost per energy unit was satisfied, from one or more of the available energy unit suppliers, the lowest cost energy supplier would be selected, and the minimum dead-band variance would be selected.

This system further contemplates that prices posted by different energy unit suppliers will contain at least the 3 following components: (1) an energy unit component, (2) a distribution delivery cost and (3) a transmission delivery cost imposed by the distribution and/or transmission infrastructure owner or operator to move the energy units from their place of origin to the premise. The system has the ability to access and display to the owner, occupant or bill payer, the many different sub-components making up the total cost of energy units supplied to or available to the premise. [FIG. 4 feature of ITEMIZED COST REPORT.]

During the selection process for an energy unit supplier, the system may select the lowest cost energy unit provider based on the total cost the energy units delivered to the premise. If multiple suppliers or types of energy units are available for the same price point, then the system might select the supplier of choice based on user-specified energy unit type and supplier preference settings. If preference settings are not entered, then the system might rotate the suppliers to achieve equal election parity by type and energy units purchased during the billing period. [FIG. 3 feature of COST CONTROL SUPPLIER PREFERENCE WEIGHTING.] At all times, the system would be capable of displaying the set point and the heating and cooling dead-band range currently in effect and the actual temperature. [FIG. 2 feature of TEMPERATURE STATUS REPORT.]

In an enhanced version of the system, using the available historical data and any additional available input feeds such as outside temperature, wind speed and direction, weather information or indexes as well as UV intensity, the system will project the estimated total cost of operation for the day based on the asking price for energy units from suppliers. [FIG. 4 feature of COST ESTIMATE DAILY REPORT.]

In addition, the system would forward-project the cost of operation for each forward period (for example the next 2 hours) and pre-cool or pre-heat the premise within the allowable ranges specified by the user to minimize cost of operation during upcoming periods when energy prices are higher. [FIG. 2 feature of COMFORT PRECONDITIONING.] This real-time economic modeling would be performed by the system on an ongoing basis and the system would react to changes in energy unit pricing, external input feeds and occupant supplied changes to the ideal temperature setting and dead-band parameters to achieve maximum comfort and cost efficiency within the user defined parameters.

To offset the effects of a radical price change such as might be found in a "time of day" rate structure, the system has the ability to perform temperature ramping based on a user activated option. This option will cause the system to gradually ramp the temperature up or down over a period of time (i.e. 1 degree/30 min or 1 degree/1 hour based on either operator supplier fixed rates of change or system-computed optimal efficiency rates) in response to energy price changes. [FIG. 2 feature of COMFORT RAMPING and FIG. 4 feature of WEATHER MODIFIED COMFORT RAMPING.] The optimal ramping algorithm would be computed and executed if user-specified rates are not present, based on the premise heat gain or loss historical data modified to reflect current conditions. Utilizing this ramping technique, not only reduces energy usage during higher price periods, but also permits a gradual temperature change to occur in reaction to the higher price. Ramping back to a narrower dead-band as prices drop or if a gradual recovery option is selected, uses a reverse recovery ramp. During periods of radical price change, ramping will avoid or reduce the possibility of engaging the heating or cooling systems second or third level heating and cooling cycles which usually self-engage when a temperature differential of more than 3 or 4 degrees exists between the set point and the actual temperature.

The second and third stage heating and cooling cycles mentioned are incorporated into most modem reverse cycle or heat pump systems, and utilize multiple speed compressor motors for second and above-stage heating and cooling and auxiliary resistive heat strips, or in the case of a dual fueled system, gas fired burners to supplement heating demands. In most cases, the initiation of subsequent stages of heating or cooling cycles on such systems results in an energy consumption rate of two times that of the first stage. By maintaining the systems operation in the first stage cycle, maximum energy consumption efficiency is achieved. If, however, thermal recovery does not keep up with the computed or specified ramp, subsequent stages of heating or cooling will automatically be initiated when needed and if so equipped. As a result, recovery ramping, when used in conjunction with multi-stage heating and air conditioning systems, will minimize excessive energy usage and a gradual return to a narrow dead-band range by avoiding second and third stage initiation.

To maximize energy efficiency while the premise is not occupied or is vacant, as might be the case for a vacation home or second residence, the system would support a minimum requirements function which would permit the entry of a very wide dead-band range which would be enabled by the premise owner, occupant or bill payer when conditions warrant. In the minimum requirement mode, the dead-band would be set at the maximum range regardless of the price of energy units (i.e., 40 degrees for heating and 90 degrees for air conditioning). [FIG. 2 feature of TEMPERATURE LIMITING.] These degree settings would, in most cases, be entered by the party enabling the function. Depending on the climate at the location, only one of the parameters may be needed to protect the premise from freezing or excessive heat buildup.

To support such a condition, the system may accept a minimum range of 000 and a maximum of 999, which will be recognized as an off condition for the cooling and heating systems, respectively. Utilizing such a system allows the occupant or utility bill payer to define comfort in terms of both environmental comfort and willingness to pay parameters, and would allow the energy unit supplier to achieve load management and maximize the utilization of resources by adjusting the energy unit pricing to increase or decrease demand for their product.

The system in its simplest form would use occupant input parameters and energy supplier asking prices for energy units to select the energy supplier offering the lowest possible price from the available energy suppliers for current and future time periods. [FIG. 2 feature of COST CONTROL LEARNING.] In the enhanced embodiment of the invention, the system will make the selection of an energy supplier also based on energy usage history data. [FIG. 3 feature of HISTORICAL COST CONTROL LEARNING.] The energy unit usage rate of associated heating and cooling system devices attached to the system will vary depending on their particular designs and capabilities. For example, a standard air conditioning system usually has a fairly consistent usage rate. In comparison, more sophisticated heat pumps have multiple speed compressors, fans and the ability to direct air flows using damper controls to more efficiently maintain indoor temperature. Mixed fuel source units may have different usage rates depending on the fuel source being used (i.e. gas heat versus heat strips in the second or third stage of heating in more sophisticated heating systems).

To manage and report the cost of operation statistics to the occupant or bill payer if that feature is desired, the system will need to have the energy unit usage rate of operation for each of its controllable heating and cooling devices in each of its possible configurations. In addition, the system will need access to actual run time data to compute the estimated level of consumption for each controllable device. [FIG. 4 feature of MULTI-SYSTEM CONSUMPTION AND COST CONTROL.] This energy unit consumption rate data at a minimum will be entered directly into the system as an optional parameter by the occupant or bill payer or system installer at system installation [FIG. 2 feature of MANUAL CONSUMPTION ENTRY.] or could be supplied to the system directly by a sub-metering device or by another system such as the InterLane™ Home Manager or Power Manager on an interactive real-time basis. [FIG. 4 feature of AUTOMATIC CONSUMPTION ENTRY.] If interfaced to another system such as the InterLane™ Home Manager & Power Manager, the system would have the ability to record into the memory of or share operational statistics and all other historical data with the other system over a communications channel, thus improving the overall reliability and efficiency of both systems.

The system would use its historical usage data to project future energy demand and produce economic models to obtain the maximum benefit for the occupant or utility bill payer and the utility. By utilizing the energy unit consumption signature for any monitored and sub-metered appliance, in conjunction with weather related data, the economic model will continuously calculate and predict the future operating expense of the premise and individual appliances using the historical energy consumption signatures and external factors. This predictive model will be used at a minimum to estimate future energy unit needs, costs, and identify and alarm unusual or abnormal consumption patterns. [FIG. 4 feature of WEATHER CORRELATED HISTORICAL CONSUMPTION ANALYSIS.]

In addition, this economic model will be capable of supplying normalized input data into energy efficiency modeling tools such as the DOE-2.1 energy efficiency model to compute the overall energy efficiency of the premise. The system also will provide comparative reporting on the efficiency of each monitored and measured appliance either directly or indirectly.

With the addition of sensing devices or data supplied to it from another source, the system would build and maintain the history of these additional data points for inclusion in its model and, as a result, would be better able to project the most efficient forward planning model based on the occupant-supplied parameters. For example, the system could obtain, using a communications medium, weather information or indexes that it would use to maximize its efficiency. [FIG. 4 feature of AUTOMATIC WEATHER DATA ENTRY.] Information like an approaching front, afternoon prediction of rain, a projected increase or decrease in wind speed, or change in direction, cloud cover or humidity could all be received over the communication link as codes or indexes and used by the economic modeling tool to effectuate the optimal environment and energy unit cost consumption scheme. The addition of an occupancy sensor or an interface with an occupancy knowledgeable device, such as an intrusion alarm system via a communications channel, would permit the system to generate greater savings by allowing greater use of the dead-band during periods when the premise is vacant without jeopardizing the comfort of the occupant. [FIG. 3 feature of COST CONTROL OCCUPANCY SENSING.]

Upon detection of occupancy by a motion sensing device or communication from an occupancy knowledgeable device or system, such as an intrusion alarm system, the system could re-compute the most economical and environmentally comfortable model based on the occupant-inputted parameters and the energy unit suppliers' ask prices and adjust the heating and cooling systems to narrow the dead-band range to an occupied state. To provide even greater savings when the premise is in an unoccupied state, the system could accept additional price and variance dead-band parameters to be used in the unoccupied state that might provide even greater variances in the dead-band than when the premise was in an occupied state. This feature is not the same as the minimum requirements function mentioned above.

An enhancement to the systems base functions may include the ability of the system to develop a human factors profile of the occupants assuming they are not in a fixed set point environment by tracking and recording changes in the set points. At a minimum, two types of artificial intelligence will be incorporated. First, the system will track patterns of set point change as they relate to times of day, days of the week and, at a minimum, track changes in these patterns for exceptions such as holidays. This function would enable the system to track set point patterns or routines. For example, on Monday through Friday the occupant changes the set point at about 7:30 AM to reflect a set back set point and changes it back to the normal setting at about 6:00 PM. At about 10:45 PM everyday, the occupant changes the set point to a set back set point. These patterns might reflect an occupant's desire to have different set points established during periods when they are at work or asleep.

By activating a function in the system called "follow my lead", the system would track such changes in set points and, over a period of time, would be capable of automatically performing such set point changes. The occupant would enable this feature of learning and automatically executing the learned patterns. In addition, the occupant would be capable of resetting the learned patterns or disabling the automatic execution of these pattern at will. [FIG. 2 feature of TEMPERATURE SET POINT LEARNING.]

The second of a multitude of such artificial intelligence features would be the tracking of set point changes by the occupant in relationship to the outside weather conditions. Whenever the system detects a change in the set point, it would be capable of recording and tracking the weather conditions outside and develop a correlation to these factors. [FIG. 4 feature of WEATHER CORRELATED SET POINT LEARNING.] An example might be that on day when it is cold and the humidity is low, the occupant might increase the set point to maintain a level of desired comfort. The reverse condition might exist when the temperature and humidity are high and the occupant lowers the set point to maintain a desired comfort level. This ability to track external weather factors and automatically adjust the internal environmental conditions to meet the occupant's desired comfort factors will operate and be controlled in a similar fashion to those described earlier in the first example. By utilizing these control and comfort patterns, the system will be able to maintain the indoor air (and similarly other environmental conditions) to achieve the desired comfort conditions of the occupant while, through performing the energy unit management functions, minimizing energy consumption cost, to achieve a balance of comfort and energy consumption efficiency.

In its simplest form under current regulation, the system would be able to select between the current suppliers of energy for the premise. The total energy units consumed would be reported on the metering devices for the energy types attached to the premise. These could be, as examples, an electric, steam, gas, fuel cell or photo-voltaic system meters. The total premise energy units consumed by type as a function of time would be recorded at these metering points. When choices of suppliers are made available to the system, the system will track and record in its memory (and have the ability to also store these values in other systems' memories such as the InterLane™ Home Manager and Power Manager systems) the supplier of choice by type elected for the premise and consumption as a function of time, supplier and price paid. This data then may be communicated via a communications channel to either the energy unit broker for the premise or directly to the suppliers of the energy units for purposes of billing. [FIG. 3 feature of COST TRACKING AND SUPPLIER NOTIFICATION.]

The system also will be capable of managing debit accounts, prepaid accounts and credit accounts for the occupant or energy unit bill payer. The accounts will be charged or decremented based on consumption and a certain supplier may be eliminated from the system's schedule of available suppliers in the case of a prepaid account when the account balance reaches zero. For debit account capable systems, a low balance warning indicator will alert the occupant when the available credit with a particular supplier is low. [FIG. 3 feature of COST ACCOUNTING AND SMARTCARD ACCOUNT CONTROL.]

If the unit is attached to a communications channel, then it may have the ability to provide the energy supplier of choice its current and projected demands for energy units which will aid the energy unit supplier in determining if sufficient product is available, thus permitting better management of its resources. [FIG. 3 feature of AUTOMATIC SUPPLIER NOTIFICATION.] The communications channel also may be used to update the debit account balance for an energy supplier based on payments by the occupant or bill payer. [FIG. 3 feature of AUTOMATIC COST ACCOUNTING.] If the energy unit supplier projects a future oversold condition based on future usage predictions, the supplier may be able to prearrange for additional energy units from other suppliers or brokers or will have the ability to raise the price of the energy. An energy price increase may result in a communication to all potential purchasers of the energy units for upcoming time periods that a price change has occurred, causing the individual premise systems to re-compute their economic models and either remain committed to the provider and the new price per energy unit, curtail usage or switch to another energy unit provider.

This capability will assist the energy unit suppliers in maximizing their efficiency and profits without drastically effecting the comfort or economics of the occupant or energy unit bill payer. Under this win-win scenario, both parties will have the ability to manage their economic flexibility to the maximum.

In addition to managing the environmental temperature controls of the premise, the system will be capable of testing for low or high temperature alarm situation should there be a malfunction of the heating or cooling system. Under these conditions, if a dual system is installed, then the system will attempt to switch to the lowest cost alternative fuel source to correct the temperature setting. [FIG. 4 feature of AUTOMATIC FAULT RECOVERY.] In either case, the system will alert the occupant through a visual and audible alarm and if equipped with a communications channel, then will send an alarm condition alert to a designated location based on the user-supplied alert parameters. In the case where the user does not enter an alarm setting for high or low temperature settings, a default of + or –5 degrees above or below the maximum variable dead-band comfort settings may be used. [FIG. 2 feature of TEMPERATURE ALARM SET POINT.]

If the set point control is placed in the off position, the alarm feature will have the option of being defeated or at the user option, will turn the unit on to maintain the indoor temperature at either the maximum dead-band setting or at the alarm point setting until the indoor temperature remains in the dead-band setting for a period of 1 hour without the assistance of the heating or cooling system. [FIG. 2 feature of ALARM OVERRIDE CONTROL.] At that point, the system will return to the off condition. Under this wake-up and shut-down scenario, the alarm will not be activated unless the indoor temperature cannot be maintained within the user-defined dead-band range. In such a situation, the alarm will be activated to notify the occupant or, via the communications channel, the contact point of user choice that a high or low temperature condition exists and maintenance is required.

In large facilities, where multiple temperature sensing or control systems are installed, the system will be capable of acting independently of other systems of a similar nature or as a master or slave unit. Under either scenario, only one unit will have the authority to commit the entire premise as to the preferred types and sources of energy units to be used in the current and upcoming time periods. Under this condition, the units will be equipped with a local communications channel to permit them to share data and one will be capable of communicating to the energy unit suppliers of choice to commit the premise for the current and upcoming time periods and communicate alarm conditions at the premise if so equipped and capable. Under this multi-system approach, if the local communications channel fails, the units will individually operate based on the lowest available cost scenario by in a less sophisticated manner, and an alarm condition will be activated. [FIG. 4 feature of NETWORK ENABLED CENTRALIZED COST CONTROL.] Such a system is shown in FIG. 6, for example, and described above.

Under either a single system or multi-system scenario, if an external communications channel is available but fails, then a local alarm condition will be activated, and the system will function under the same scenario that it normally would if no communications channel were used. [FIG. 3 feature of AUTOMATIC DATA ENTRY HOLDOVER.] If integrated with an advanced premise monitoring and control system like the Interlane™ Home Manager or Power Manager, described in U.S. Pat. No. 5,573,438, then the outside communications channel in most cases would be shared by the two systems and monitoring of alarms may be performed by the supplier of the premise monitoring and control system. In addition, interfacing with an occupancy awareness system such as the First™ Alert Professional premise intrusion alarm system, which includes a communications channel to an alarm monitoring center, could provide an alternate communication channel for the receipt of energy unit supplier data or transmission of energy unit commitments and billing data to suppliers and bill payers. [FIG. 3 feature of COMMUNICATIONS RESTORAL.]

The system also will have the ability to act as the total premise energy unit supply negotiator because of its ability to access and compute economic models based on user choice and access to available energy unit supplier pricing. In this capacity, the system not only selects the energy unit supplier for the indoor air management function and controls the associated devices, but will also be able to specify the energy unit supplier or suppliers of choice for the entire premise. This expanded functionality will allow the system to specify the supplier of choice for the premise from all available energy unit supplier categories and elect that supplier as the designated supplier for the interval of time that the system computes as the most economical for the premise. [FIG. 4 feature of CENTRALIZED PREMISE ENERGY COST CONTROL.]

Since energy unit suppliers may vary the time periods over which their price for energy units is set, the system's economic model will be flexible enough to take these and other variables into account. Some other variables that the system will be capable of including in its economic model may include, be but are not limited to: a minimum amount of time that must be committed to taking energy units (i.e. N hours, N days, N months, N billing periods, etc.) or a minimum number of energy units (i.e. Kilowatt hours [KWH's] or BTU's per hour, day, month, billing period, etc.) or a time frame preceding a future time interval by which a commitment to take energy units must be made in order to lock in the price and reserve the energy units needed. These conditional hurdles may reflect volume discounts or penalties based on volumes consumed and may be modified by time factors which encourage use in off peak demand time intervals and discourage use in on peak demand time intervals. [FIG. 4 feature of STRATEGIZED COST CONTROL.]

By interfacing either directly or indirectly with the master metering devices for each of the energy unit usage category recorders for the premise, the system will be able to report total cost of operation for the premise on an instantaneous real-time basis and historically for any past period or time interval on an aggregated basis, or by energy unit type or by energy unit supplier or any combination thereof. [FIG. 3 feature of AUTOMATIC PREMISE CONSUMPTION ENTRY AND REPORT.]

In addition, the system will have the capability of controlling other major and minor loads in the premise as an extension of its whole premise energy unit supplier selection capability. [FIG. 4 feature of SUBSYSTEM COST CONTROL.] An example of controlling a major load would be controlling water heating, which might be accomplished by a single energy unit supplier or more than one. To illustrate this point, water may be heated in a dual fuel water heater using either gas or electricity as a direct energy unit source. Water may also be heated using a heat recovery system attached to the air heating and cooling system. The system will have the ability to perform the necessary economic modeling to determine if water should be heated directly using the cheapest form of energy unit available (i.e. electricity or gas), or by operating the heating and cooling system, or a combination of the two.

In a similar fashion, other inductive and resistive loads may be added to the system's control capabilities to ensure that their operation is managed in the most cost effective and efficient manner. An example of controlling a minor load would be the control of lighting circuits or sprinkler control circuits at the premise. The system will be able to compute the sunrise and sunset at the location using the latitude and longitude of the location.

Using the expanded energy management capabilities of the system will allow it to more effectively manage the overall economics of the premise by taking into account multiple consuming devices, their alternative operating energy unit sources and the available energy unit suppliers. By aggregating these requirements, in the most effective operational scheme, the system will be able to meet the minimum time, quantity and duration requirements of the energy unit suppliers available to the premise while maximizing the economic efficiency of the premise through control either directly or indirectly of major points of energy unit consumption.

An extension of the expanded energy management capabilities of the system will allow it to communicate the projected total premise energy unit requirements over a communications channel to a central location designated by the premise owner, occupant or bill payer for the purpose of aggregating the total energy unit requirements of multiple premises together. [FIG. 3 feature of AGGREGATION.] This capability will permit the leveraging of the aggregated energy units and types together and will permit energy service companies, corporations and user groups to amass large energy unit requirements together and achieve greater buying power from energy unit suppliers.

Under this centralized approach, energy unit price hedging for extended periods of time as well as negotiation for take-or-pay commitments can be negotiated and committed to centrally. Under this scenario, the central aggregating location, would communicate an override energy unit supplier of choice for each energy unit type to the participating locations which would be then utilize the centrally-computed best supplier and type choices for their operational needs for the time periods specified. [FIG. 3 feature of AGGREGATION SUPPLIER SELECTION OVERRIDE.] A system which may use this approach is shown in FIG. 6. This concept of pooling energy unit requirements to maximize buying power in a re-regulated environment will permit small and large energy unit consumers to compete on equal footing for lower prices by combining the needs of multiple locations to achieve greater volumes.

The system will utilize a user interface device located in the premise [FIG. 2 feature of the LOCAL USER INTERFACE.] as well as provide for remote inquiries in more advanced versions of the system, to provide operational feedback to the premise occupant or bill payer (which may be the owner, manager or an energy services company under contract to owner or occupant) and permit them to access information on system operation. [FIG. 3 feature of REMOTE USER ACCESS.] It will also provide a vehicle for them to input data and retrieve instantaneous and historical operational statistics and reports stored in the system's memory either locally or remotely depending on the configuration of the system and network to which it is attached.

The interface device will supply, at a minimum, the following items: The current supplier of energy units, the current price per energy unit, the current operating cost per hour based on the rate and cost of energy units being used, the total energy units used and their cost for today, this week, and this billing period by supplier and energy type if multiple types are available, the total energy units used by type and their associated cost for the day, week and billing period, the balance of available credit per energy unit supplier and an estimate of the available hours and days of energy unit purchases that represents if a debit system for prepaid energy is being used, a computed average cost per energy unit by supplier and a percentage of the total energy unit requirement being purchased from that supplier, a breakdown of energy units consumed and their cost and supplier by individual appliances if multiple appliance control and metering is activated, a projected total billing period cost for each energy type and source and an aggregated total by type and source of energy unit, a history of temperature set points for the day, an average of temperature set points for the week and billing period, historical totals of energy units usage and cost for this month, last month and year to date, the current temperature set point, the current dead-band high and low degree spread, the average temperature maintained for the day, week and billing period, the average thermal degree gain or loss per unit of time for the premise for a rolling 30, 60 and 90 day period by hour of the day, the average thermal recovery time per degree when heating and cooling systems are operational for a rolling 30, 60, and 90 day period by hour of the day, the projected annual cost of operation for each of the appliances being monitored, the operational efficiency factor of each appliance being monitored based on historical consumption patterns and current operating statistics, the current settings for minimum and maximum dead-band temperature and cost settings, warning indicators of operational irregularities in monitored appliance consumption patterns, warning indicators for low balances in debit accounts if prepaid energy unit accounts are present, average daily cost of operation of whole premise and individual appliances on a 30, 60 and 90 day rolling average and same period last year, data, text and billing messages from energy unit suppliers and information sources, weather information and history data including outside temperature lows and highs, humidity, chance of precipitation, wind speed and direction and Ultra Violet [UV] indices by day, by week, by billing period, total heating and cooling degree days and other statistical data needed to normalize consumption and usage data, user defined energy unit type preference, temperature ramping option indicator, ramping rate by time and degrees, high and low temperature alarm settings, communication channels statuses, points of contact and routing data, user supplier estimated energy usage rates for non-metered major appliances under the control of the system, alarm set indicators by alarm type and designated points of contact for alarm events, interface parameters for other premise control systems and occupancy awareness and alarm systems, alarm conditions and system health reporting status, master/slave interface parameters and status, local and remote communications system status and alarms, centralized load aggregation system or service interface parameters and status, maximum energy unit price point exceeded alarm, maximum energy unit price point exceeded history data, maximum energy unit price point exceeded system action indicator, cost of energy units, cost of distribution and transmission system capacity used for delivery of the energy units.

Below is a general description of each of the embodiments of the system shown in FIGS. 2–4.

FIG. 2 EMBODIMENT

An implementation of the system in its most limited form is illustrated in FIG. 2. This implementation includes a keypad for all input data, a temperature sensor, a small LCD text-based display, an audio transducer and contact closures for controlling an HVAC unit (not shown) in a home or business. The unit is controlled by a simple microprocessor and may be contained within a case similar to thermostats presently available. The unit may be powered by a battery in this implementation.

The unit may retro-it an existing wall-mounted thermostat with the same wiring scheme. The specific features it will provide are time of day cost and comfort-based temperature control with ramping, preconditioning, temperature limit alarm, password-protected data entry, temperature set-point learning and cost-control learning, which features are described in more detail below. Energy supplier selection is performed manually by the user, by entering the cost data of the supplier selected.

All data is entered through the keypad 7, scanned in by functions 12 and 14 and stored in memory function 21. A micro-controller (not shown) may provide the scanning and data storage. To aid in the input process, user feedback will be provided on display 53 which will guide the user through the data entry process. For example, if the user enters the key sequence to begin entering cost information, then the user will be prompted for supplier ID, rates, start time for each rate, length of time the rate is valid, fees, the HVAC consumption in kilowatts and the correct time, day, date and 12 or 24 hour format, for examples.

For temperature data, the user will be prompted for set point, set point control on or off, dead-band or high/low mode, high and low values for the selected mode, temperature set point learning on 1, on 2, off or forget, alarm on or off, alarm high and low thresholds, temperature limiting on or off, high and low limit values, Centigrade or Fahrenheit temperature degree units and password protection on or off, for examples.

For comfort data, the user will be prompted for ramping on or off, preconditioning on or off, rate of change for ramping and preconditioning (at fixed intervals in minutes per degree or learned), maximum cost at set point, maximum cost at high value, maximum cost at low value, high value cost over limit hold or shutdown and low value cost limit hold or shutdown, for examples.

Certain data is not required under certain conditions such as the supplier ID when only one supplier can be entered. Some data is optional such as the maximum cost points. If none of the three entries is made, function 36 will review the cost input data or rate tables to determine the lowest and highest rates that will be in use and use them as input for the maximum costs at set point and high and low value temperatures. Entering just the maximum cost at set point will cause the highest rate to be used for the high and low values. And entering either maximum cost at the high or low value will make the cost of the other value the same and the lowest rate in use will be used for the set point. If there is no cost data, then no cost points will be entered and all cost control features will be dormant. Once the cost data is entered, all three cost points will default to those values selected above but the user can make any changes.

Other optional data includes the HVAC consumption, which if missing will change the energy cost display (C) to run time accumulator display and options such as temperature set point learning, ramping, preconditioning, alarms, etc., most of which will have default settings which the user can change.

As noted, the cost data is required for any of the cost control features to function or the unit will function like a standard thermostat. The clock input is required to synchronize reactions to time of day rates. The temperature sensor input also is required and continuous values are produced by function 15 and stored in memory. Any data for which a default value cannot be established will become required data.

The fixed set option is implemented with password protection of the temperature data. In the temperature data entry screen, the user can select that a password be used to change the data after the present entry. If selected, then the user will be prompted for a key sequence of up to 6 keys and prompted to verify the sequence. All subsequent user access to the temperature entry screens will be responded to with a request for the password. It will be possible to view the data but not change it without the password. Changing the password requires accessing the screens with the old password and then selecting a password be used and entering the new one.

Once all required data is entered or determined, the processes, functions 33, 34, 35 and 36 begin their operation. Function 33 set it's time, date and day of the week as soon as those values are entered, continues to update them and provide data to the other processes. Function 34 prepares a temperature status report for the display, function 43. Function 36 sends temperature updates to the display continuously and calculates the cost versus temperature table that defines the dead-band variance from the set point temperature based on the rates entered in the rate tables in use. Function 36 will determine a schedule based on when the rates change at which point the rate in effect determines the variance or temporary set point used meet the cost/temperature table.

Options selected by the user that affect this operation are ramping and preconditioning. These comfort-based options reduce any drastic swings in temperature due to large changes in cost. Ramping allows for gradual change in temperature over time. One degree of change in 30 or 60 minute intervals or two learning modes can be selected. Learning mode 1 first determines the natural thermal rate of change for the premise by allowing the temperature to rise (or drop, if heating) by one full degree and measures the time it took. This becomes the minimum time to the new temperature. Then it takes half of the length of time that the rate change is in effect and this value becomes the maximum time to the new temperature. A portion of the difference (half, for example) between these two values is used to calculate the time to the new temperature and the time interval to be used for the one degree changes.

Learning mode 2 instead keeps track of the dwell time or on/off time prior to ramping taking effect. It then calculates the cost ratio between the present and new rates and changes the on/off ratio for the existing on to off period to spend the same amount of money over the period. No specific temperature during this ramping period is set until the temperature calculated for the new rate is reached, at which time normal operation is restored.

In either case, the time to reach the new temperature is recorded and used to time the start of the reverse process prior to the rate changing.

Preconditioning, which can be used with or without ramping, pre-cools (or preheats) the premise prior to a rate increase by the number of degrees selected by the user. First the rate change for cooling (or heating) is determined by measuring the time it takes to cool the premise one full degree. This value, multiplied by the number of user-selected degrees determines the starting time prior to the rate increase. If ramping is in use, then it will use this lower temperature to calculate the rate of change for its operation which lowers the overall temperature during the higher rate period.

The two variations of cost control operate with some differences. The dead-band mode allows the user to vary the set point and maintains a fixed value above and below it for calculating the response to rate changes, while the high/low mode fixes the highest and lowest temperatures the user is willing to accept regardless of the set point and recalculates the response with each new set point. If the set point is raised or lowered beyond these limits, then the set point becomes the limit.

A malfunction will be declared when the temperature limit alarm is exceeded if set point control is on. A default setting of 5 degrees beyond the maximum dead-band variance, or high/low values which the user can change, will be used. If exceeded, then the unit may flash the display and activate the audio output device. If the set point control is off, then a temperature limit exceeded will be declared since no control is being attempted. Under this condition, if the temperature limiting is off and the user enables the override feature, then the alarm will turn on temperature control until the temperature is stable within the alarm limits for at least one hour.

Temperature set point learning, if enabled, will learn the user's set point preferences with regard to time of day and day of the week without the need to explicitly define them. The unit will note each change in the set point and record the time of day and day of the week. After two consecutive days of similar changes at similar times, the unit will institute the change on subsequent days. Upon initializing the change, it will note on the display the learned change is in effect and will ask for approval or disapproval. With no input or approval, it will continue on subsequent days as is appropriate. With disapproval, it will continue to monitor the changes until a pattern is recognized which meets with approval or no input.

Unless the user makes the same change on a weekend day, the unit will not institute the learned changes. After two or more weeks of no disapproval, the unit will no longer ask and changes to the learned pattern will require setting the learn mode to forget. Holidays will not be addressed in this implementation but the user may change the set point at any time. Should the user wish for holidays to be treated as weekend days or for all days to be treated the same, or other, that information may be programmed by the user, in one embodiment.

The reports available from function 34 include three categories: temperature, cost and comfort. The user will key in a category and will then move from screen to screen until the required information is viewed and a return to the default screen is requested or sufficient time without additional key activity is noted.

Cost information includes: the current supplier (A) if an ID was entered; the current price of energy (B); the HVAC cost (C, f), if the consumption was entered or the run time for HVAC for the day, week or month, and the time day and date.

Temperature information includes: the temperature set point history for the day (J); the present set point (M); the average temperature for the day, week billing period (O) and the alarm temperature settings (d).

Comfort information includes: the current dead-band spread (N); the current dead-band temperature and cost (T); ramping status and rate (b, c) and the maximum cost exceeded alarm price and action (l, m).

FIG. 3 EMBODIMENT

A more enhanced residential embodiment of the invention is shown in FIG. 3. This embodiment includes an energy meter capable of communicating with the system, a keypad, a phone keypad entry interface and remote control device for user input, temperature and humidity sensors, an interface to a security system, a small LCD text based display, a voice output device, a television interface device, and a two-way communication link to outside service providers and contact closures for controlling the HVAC unit in a home. The system is controlled by two microprocessors and is contained within a thermostat-like unit and an audio video [A/V] Processor. In this embodiment, the thermostat-like device has similar functionality to that in the FIG. 2 embodiment but is slaved to the A/V Processor. The A/V Processor unit is line powered and the thermostat-like device may be either line or battery powered in this embodiment.

The thermostat-like unit will replace the existing thermostat and will contain the keypad, temperature sensor, humidity sensor, display, audio transducer, contact closures and a microcontroller. There also will be a communications link between it and the A/V Processor which contains the remote control interface, the phone line interface for phone keypad entry, a voice output module, the ANV and RF interfaces and format conversion to the television, the communications link to the meter and a microprocessor. The A/V Processor can connect the voice module to the phone line for remote inquiry and control by phone, to the television for voice response or to an in-home ANV or intercom system, which can also be tied to the home security system.

As a distributed system, the functions are divided between the two units. The A/V Processor will have functions 11, 12, 15, 21, 31 through 35, 41 and 42 while the thermostat-like unit will have functions 14, 15, 36 and 44. The inter-function communications for separated functions may use powerline carrier communications such as Consumer Electronics Bus [CEBus], X10 or LonWorks or may use a proprietary or standards based RF link or any other type communications channel.

Features provided by the system of FIG. 3 include all those provided by the system of FIG. 2. Additional features are made possible by the configuration of the system of FIG. 3. They include: automatic cost entry, cost control supplier preference weighting, historical cost control tracking, cost control occupancy learning, cost tracking and supplier notification, cost accounting and SmartCard account control, automatic supplier notification, automatic cost accounting, automatic data entry holdover, communications restoral, automatic premise consumption entry and report, aggregation, aggregation supplier selection override and remote user access, as described above.

Besides manual entry of user data as illustrated in FIG. 2, a communications link to a network of energy suppliers, brokers and resellers will provide formatted cost data for each supplier. The A/V Processor, using function 12, will collect these rate tables and, with function 21, store the information. The rate tables stored are from a group of suppliers which are selected directly by the user who will either manually input the preferred suppliers or criteria for the system to use to select acceptable suppliers. The criteria can include energy type, location or distance, length of commitment, payment terms, guarantees of service, price, and others. Alternatively, suppliers may be suggested by the system based on the short term history profile of consumption. This profile will be collected by function 11 communicating with the energy meter and storing usage over time.

An additional user input device will be the remote control unit used in conjunction with the television. The data entry process described in FIG. 2 applies in the system of FIG. 3 as well and will be formatted and converted to video or modulated radio frequency [RF] for presentation on a television screen. All manual data input could then be made using the keypad on the remote control.

Still another user input device will be a standard phone which can be locally connected or dialed in from a remote location. This feature will work in conjunction with a voice output device to provide feedback and information to the user. As in most Interactive Voice Response [IVR] systems, the user will enter a keypad sequence to enter the system and be prompted for selections which will be entered on the phone keypad. The system will respond with a voice output for all inquiries and acknowledge any commands entered. This feature will be used for sightless or vision-impaired users in lieu of the television output interface although the voice response may be incorporated into the audio of the television interface as well. Deaf users would use the LCD display or television screen messages for feedback when entering data and audible alarms will be supplemented with blinking lights within the premise that will be controlled through CEBus, X10 or other appropriate control.

An equipment interface will be used to access a security system for status notification. The security system will be used to determine if the premise is occupied to provide cost control occupancy sensing. When the user arms the security system, it is assumed the premise will be unoccupied and the temperature set point will be changed to a user-defined or default level until the security system is disarmed. If enabled, then the temperature may be restored to the occupied set point prior to a user's return based on the cost control learning, as in the system of FIG. 2. Additionally, in a cooperative environment, it will be possible for the security system to elicit from the user, a return time and date which would then be used to restore the premise to the occupied set point. It is also possible in this environment that the system could be the user interface allowing it to set the security system.

The interface to the security system can be CEBus messaging over powerline carrier or LonWorks, X10, twisted pair cable or other such communications link. Since the security system includes a phone line for alarm notification and can use modem-based communications, this capability could provide for communications restoral for the system by using the security system to route data to the energy suppliers when the primary communications link is inoperative. Once the link is declared out of service, the system will send a request to the security system asking it to establish a transparent data session and provide a phone number. The security system would then pass the data payload of the CEBus data packets transparently to the suppliers and encapsulate any data from the supplier in a CEBus packet and send it to the system. In this cooperative environment, the security system could use the system for access when its communications link is down. If the security system cannot operate in this manner, then the system can revert to an automatic data entry holdover mode where the system will maintain the last good set of energy cost data, continue using the last selected supplier and operate in the manual mode as in the system of FIG. 2.

An additional sensor input for this embodiment may be the humidity sensor. Indoor humidity data will be combined with indoor temperature to determine a comfort zone limit for varying the temperature set point based on user comfort. The user will enter the level of comfort desired as a percentage of the ideal comfort level and the temperature-humidity index will be used to modify the set point to reduce cost while reflecting this comfort level. A value of 100% will equal the exact user-defined or learned temperature set point as the center of a range of temperatures of approximately the same comfort level where the limits of the range are defined by the temperature-humidity index. A value of 0% will equal the temperature at which, for that humidity level, most people would feel uncomfortable. If the user selected a 50% comfort level, then the temperature will be half way between the two defined temperatures. The range of temperatures will vary dynamically as the humidity level changes within the premise.

Once all of the data needed is entered, determined or collected through the communications link or manual entry, the processes implementing functions 31 through 36, begin their operation. This occurs through software operating on a processor, as described. Any data not available but required for a specific function's operation will disable the function until that data is available. The lack of that data will be reported as an alarm. Function 33 sets its time by querying the appropriate device or resource, if time data is available, and if not, then from manually entered data. If time data is not available, then a critical alarm will be generated and no functions requiring time will be performed.

Function 31 will provide the load estimation process by collecting, on a continuous basis, energy consumption from the premise energy meter and developing load profiles and trends. These load profiles will be generated on an hour by hour basis for a day, week or on a rolling 30 day average with trending to estimate future loads.

Function 32 evaluates each set of rate tables for each supplier by calculating the cost of energy for the existing load profile, if available, or simply compare each supplier's rates hour by hour and selects the lowest rate available. Supplier energy rate tables are stored in function 21 and used to calculate the cost for a user-selected time period or default to a 30-day period and select the lowest cost supplier. As discussed previously, the user preferences will be used in the selection process. Once the supplier is selected, the choice, the load estimate and use interval will be conveyed to function 42 which then automatically communicates the data to the supplier, broker or billing agent. As energy use accumulates, function 32 will maintain the consumption and report through function 42 the consumption to the supplier, broker or billing agent.

If selected, then the cost accounting feature will manage debit, prepaid and credit accounts. For credit accounts, charges will be calculated and displayed through function 43 to the user for each billing cycle and a estimated bill for the present billing cycle will be provided on an on going and forward projecting basis. For debit and prepaid accounts, the balance will be displayed and decremented on a continuing basis. With debit accounts, payments to the supplier will generate balance updates in the system.

For both debit and prepaid accounts, an alarm report and a voice message will be generated to inform the user of a balance through function 35. If the balance drops to zero, then that supplier may be dropped from the list of available suppliers until non-zero balance is reported by the user or over the communications link from the supplier. SmartCard accounts can function as debit or prepaid accounts except that the balance information will be read from and updated to the SmartCard. Energy supplier rate tables can be read and premise consumption data can be written onto the card.

With aggregation, function 32 will report to a central site, providing load profiles, projected consumption and preferred energy supplier. It also will accept a different energy supplier from the central site overriding its own selection.

Function 35 will monitor the system for faults and provide alarm statuses and initiate alarms as audio or visual outputs. The types of faults this function will collect include those detected and reported by other functions and those it independently detects. Alarms reported by other functions include a loss or poor performance of an internal or external communications link, low account balance for selected supplier, energy cost exceeded shutdown, a loss of a sensor input, required data unavailable, invalid data entry or data format and a loss of the selected energy supplier data. Alarms detected by function 35 include HVAC unit operation not detected (no temperature change with contact closure), temperature limit exceeded, unit microprocessor malfunction and loss of power.

Function 36 will function as in the FIG. 2 embodiment controlling the heating or cooling through function 44 with the following added feature. It will use a no occupancy temperature set point for use when the premise is empty or the maximum dead-band or high/low value. This maximum can be modified to allow temperature changes only great enough that no more than one hour or some other programmable interval will be needed to restore the premise to the occupied set point. This is accomplished with the premise response time measurements performed for ramping as in the FIG. 2 embodiment.

The reports available from function 34 include all those in the FIG. 2 embodiment. The FIG. 3 embodiment adds to those categories and adds a new category, operations status and alarm reports and a new mode of operation, data messaging. Data messaging allows the system to recognize that a user inquiry is meant for passage to the communications link and that certain data from the communications link is meant for the user. This messaging mode establishes a channel between the user and the supplier or other networked entity and allows data to flow between them using the system communications link as transport.

Cost information available includes: whole premise consumption cost per hour; whole premise consumption by supplier and energy type for the day, week or billing period; whole premise consumption by type and cost for the day, week or billing period; the balance of available credit per supplier and an estimate of the time of use it represents for debit accounts; computed average cost per supplier and percentage of total consumption bought from each supplier; low balance warning indicator; user preferences report and an itemized cost of generation, transmission and distribution report.

Comfort information added in this implementation is an average of temperature set points for the week and billing period and those set points cross-referenced to relative humidity, if available.

Operations status and alarm information available include: communications link status, points of contact and routing data; alarm indicators by alarm type and designated points of contact for alarm trigger events; interface parameters for other premise control systems and occupancy awareness and alarm systems, alarm and system status; local and remote communications system status and alarms and interface parameters for a centralized load aggregation and status.

FIG. 4 EMBODIMENT

An embodiment of the system of the invention in a more enhanced residential, commercial and industrial form is shown in FIG. 4. This implementation includes: various types of energy meters capable of communicating with the system; submetering devices; temperature sensors; an interface to a security system; an interface to a humidifier; a keypad, an LCD text based display, an audio output device and internal communications link per thermostat-like unit; a two way communication link to outside service providers; contact closures to an on site energy supply source unit; both contact closures and communication links for controlling the HVAC units on premise and both contact closures and communication links for controlling other equipment. The system may be microprocessor-controlled and contained within multiple thermostat-like units and a standalone computer. The thermostat-like devices have similar functionality to those of the FIG. 2 embodiment but are slaved to the computer. The computer and the thermostat-like devices may be line powered.

The thermostat-like units will replace the existing thermostats and will contain the keypad, temperature sensor, display, audio transducer, contact closures and a microcontroller. There will also be a communications link between each and the computer, which will include the required keyboard, monitor, memory and storage. A communications link also will exist to the meter, outside services and other equipment.

As a distributed system, the functions are divided between the two unit types. The computer will have functions 11 through 15, 21, 22, 31 through 37, 41, 42, 43 and 45 while the thermostat-like unit will have functions 14, 15, 36 and 44. The inter-function communications for separated functions may use powerline carrier communications such as CEBus, X10 or LonWorks or may use a proprietary or standards based RF link or any other type communications channel.

Features provided by the system of FIG. 4 include all those offered by the systems of FIGS. 2 and 3, plus additional features made possible by the configuration of the FIG. 4 system. The additional features include: historical consumption analysis, historical operations analysis, itemized cost report, cost estimate daily report, multi-system consumption and cost control, automatic consumption entry, weather correlated historical consumption analysis, automatic weather data entry, weather correlated set point learning, network enabled centralized cost control, centralized premise energy cost control, strategized cost control and subsystem cost control, described above.

In addition to the manual data entry of the FIG. 2 embodiment and the automatic entry of cost data collection through function 12 in the FIG. 3 embodiment, automatic data entry is implemented by a communications link to a weather service provider, as provided by function 13. This weather information may be provided formatted in a machine-readable form and may include any number of weather parameters or a simple weather index which can be used to modify temperature set point calculations by virtue of the impact on heating or cooling or weather based learned user preferences. The weather parameters or index will be used in at least the two following ways: as a load variable which would modify the estimate of the amount of energy required, time and cost to heat or cool the premise from a specific temperature to a new set point and as a predictor for user-desired temperature set point changes.

In addition to reading energy meters of various types of energy, function 11 will read consumption data collected by submetering devices. This can be done directly or through other systems such as an InterLane™ Interactive System (described in U.S. Pat. No. 5,572,438, which is herein incorporated in its entirety). The submetering can be performed on various equipment, systems, office areas, floors and other local and remote energy consuming systems or areas.

The thermostat-like units with function 14 can still accept user input through its keypad, as in the FIG. 2 embodiment, or a subset of that input as is appropriate to this specific implementation. With multiple devices, zones can be supported within a premise and with damper control microzones could be implemented. As an illustration, it would be possible to control each apartment in a large complex independently accepting input from each and tracking consumption and preferences.

Temperature sensors distributed with each thermostat-like device will provide, through function 15, a view of temperature gradients which can be used to better balance temperatures within a building and provide for more efficient control.

Other equipment, such as the previously described security system and one or more humidifiers or dehumidifiers, will provide status information to the system. The humidifiers and dehumidifiers can provide humidity readings to enable the system to determine the best or most economical level of comfort for the premise to meet the occupant status and comfort level demands.

With a standalone computer, function 21 takes on depth in terms of more data types and function 22, which provides data storage, can include years of detailed information to make more accurate predictions and relate those predictions to more parameters than previous systems. Historical analysis can be provided as a result.

Once all the data needed is entered, determined or collected through the communications link or manual entry, the processes implement functions 31 through 36 (i.e., through software operating on a processor). Any data not available but required for a specific function's operation will disable the function until available and the lack of that data will be reported on screen as an alarm, and when a user inquiry involves that missing data. Function 33 sets its time by querying the appropriate devices or resources until an accurate time can determined, if time data is available, and if not, then from manually entered data. If time data is not available, then a critical alarm will be generated and no functions requiring time will be performed.

Function 31 will provide the load estimation process but, in addition to the functionality of the embodiments of FIGS. 2 and 3, it will include more parameters, stored in function 21, and historical data, stored in function 22, will be used to provide enhanced functions. Weather data will be used to modify load calculations to reflect the additional load that weather applies to heating or cooling the premise. With sufficient historical data collected, function 31 can provide historical consumption analysis by providing graphs and summary data of the average consumption of a premise as a function of time, temperature, or user set point changes, for example. With sufficient historical weather data collected, the function also can provide weather correlated historical consumption graphs and summary data analysis. These capabilities are used to provide trending and better predictions.

Function 32 will provide the source selection and costing process but, in addition to the functionality of the embodiment of FIGS. 2 and 3, it will include more detailed and complex operation. In the case of cost reporting, function 32 will be able to provide an itemized cost report broken down by service segment, generation, transmission and distribution as reported through function 12. Generation and transmission costs will vary with energy supplier and distance from the user and will have to be factored into the total cost of energy. The daily cost estimate report will include both present and historical consumption and weather data to project the daily consumption.

In this system, multiple heating and cooling units can be controlled through the thermostat-like device, each of which communicates with the main computer. As such, with submetering of these heating and cooling units, multi-system consumption and cost control systems can be implemented. Each thermostat-like device can work independently making all decisions regarding the local area or zone and reporting to the computer those decisions. Alternatively, each device can slave their operation to a single unit which would select the supplier while allowing each unit to then control the local temperature, thus, providing network enabled centralized cost control. With the power of a standalone computer, the system can be configured to have all decisions made by the computer and communicated to the individual devices to locally control the temperature, thus implementing centralized premise energy cost control. This centralized computing power will also allow for strategized cost control. In this scenario, indirect cost factors such as minimum time commitment required by an energy supplier to get a certain price break, minimum energy unit purchase requirement for a price point or discounts for meeting a certain consumption profile, would be considered.

In each of these scenarios, operation is dependent on the use of communication links between the computer and the thermostat-like devices. If any of these were to fail, then the device will revert to it's standalone operation using the last good cost data available until communication is reestablished. FIG. 6 is a block diagram of a system including a central processor (main computer) and numerous local processors, each monitoring and controlling a different set of load devices. Each local processor may be located on a different premise.

Function 32, in conjunction with functions 15, 37 and 45 and the submetering capability of function 11, will have the capability to control other major and minor loads providing subsystem cost control. This control will work to aid in meeting some of the requirements of strategized cost control by more closely controlling consumption. The system will be given information as to the operation of the equipment to be controlled. For example, air filters may need to run eight hours a day to maintain a certain level of air quality. Under strategized cost control, the system can reduce energy cost by shifting operation of the air filters to meet the supplier's requirement while still allowing the filters to operate for eight hours.

Function 35 will monitor the system for faults, provide alarm status and initiate alarms. In addition to the functionality of the embodiments of FIGS. 2 and 3, there will be additional functionality. Since submetering is in place and large amounts of historical data can be stored and processed, historical operations analysis can be provided. This entails extracting performance data from the collected data, tracking it over time and making periodic comparisons. For example, the time to cool the premise one degree with known temperature and weather conditions can be determined as with comfort ramping. This value can be stored and a new value measured and stored monthly. The system then can calculate a trend in operation and determine if the cooling unit is operating at the same level as when the initial measurement was taken. At a user defined level of lower performance, if provided, an alarm can activated or a report can be issued. The power consumption profile can be used in a similar manner where the equipment becomes a heavier load as it becomes less efficient.

Function 36 will function as in the FIG. 2 embodiment controlling the heating or cooling through function 44 with the following added features. Whenever a temperature set point is calculated, the existing weather conditions will modify the set point value providing weather correlated set point learning. The system will record user changes in the set point and store the set point, the change and weather conditions at that time. Whenever the weather conditions are in effect, the set point calculation will include a factor reflecting the user's preference. For example, if it is cold and damp outside for more than two days, and the user changes the set point upward by two degrees, in the future the system will adjust the calculated set point upward by two degrees at the end of the second day of the same weather conditions.

The other feature function 36 will include is the ability to make or take decisions when used in distributed or centralized system. As previously described, each thermostat-like device can operate independently but, with addition of a communications link, can take on a master or slave mode of operation. As a master, function 36 will take supplier selection and cost data from its own function 32, which will also provide that information to the slave units and the master will operate as an independent unit. As a slave, it will operate as an independent unit unless supplier selection and cost information is provided to it over the communications link. In a centralized system, the master unit will be the computer and all devices will be slaves.

Function 37 is utilized in this implementation to control other equipment in an effort to reduce cost or monitor operation. As described under strategized cost control, air filters may be controlled to shift consumption. Another example is the control of a humidifier to offset heating costs. The system can decide, based on the indoor humidity level reported by the humidifier through function 15, to use the humidifier to increase the humidity to improve the affect of heating the premise. Based on the calculated cost of heating the premise to a certain comfort level for the existing humidity level and the cost to raise the humidity to a level where less heating is needed for the same comfort level, the humidifier would be used. This method can be used for dehumidifiers and other equipment where two or more parameters can be controlled to affect a certain result and the cost of controlling those parameters based on their effect are sufficiently different.

The reports available from function 34 include all those available in the embodiments of FIGS. 2 and 3, plus additional report categories. Cost information available includes: subsystem cost report; estimated bill by energy type and supplier and aggregated totals by type and supplier; historical energy usage totals for any time period; estimated annual cost to operate any monitored appliance or system; average daily cost to operate the premise or any monitored appliance or system on a rolling average period or year to year; total heating and cooling degree days and other statistical normalization data and normalized energy use predictive reports from models similar to DOE 2.1 modeling for the premise for normalized comparative reporting.

Temperature information includes: the average thermal degree gain or loss per time period for various rolling average periods by hour of the day; the average thermal recovery time per degree for various rolling average periods by hour of the day and present and historical weather information and indexes by the day, week or billing period.

Operations status and alarm information available includes: the history based efficiency factor of each monitored appliance or system; warning indicators of operational irregularities in each monitored appliance or system and master/slave interface parameters and status.

The following is a list of minimum data elements and tables maintained by the systems in FIGS. 2–4.

Minimum Data Elements and Tables

1. The current supplier of energy units, the current price per energy unit including delivery.
2. The current operating cost per hour based on the rate and cost of energy units being used.
3. The total energy units used and their cost for today, this week, and this billing period and the past 14 billing periods by supplier and energy type if multiple types are available.
4. The total energy units used by type and their associated cost for the day, week and billing period for the past 14 billing periods.
5. The balance of available credit per energy unit supplier and an estimate of the available hours and days of energy unit purchases that represents if a debit system for prepaid energy is being used.
6. A computed average cost per energy unit by supplier and a percentage of the total energy unit requirement being purchased from that supplier including delivery costs.

7. A breakdown of energy units consumed and their cost and supplier by individual appliances if multiple appliance control and metering is activated.
8. A projected total billing period cost for each energy type and source.
9. An aggregated total by type and source of energy unit.
10. A history of temperature set points for the day.
11. An average of temperature set points for the week and billing period
12. Historical totals of energy units usage and cost for this month, last 14 months and year to date.
13. The current temperature set point, both user-set and fixed.
14. The current dead-band high and low degree spread, both user-set and fixed.
15. The average temperature maintained for the day, week and billing period.
16. The average thermal degree gain or loss per unit of time for the premise for a rolling 30, 60 and 90 day period by hour of the day.
17. The average thermal recovery time per degree when heating and cooling systems are operational for a rolling 30, 60, and 90 day period by hour of the day.
18. The projected annual cost of operation for each of the appliances being monitored.
19. The operational efficiency factor of each appliance being monitored based on historical consumption patterns and current operating statistics.
20. The current and historical settings for minimum and maximum dead-band temperature and cost settings.
21. Warning indicators of operational irregularities in monitored appliance consumption patterns.
22. Warning indicators for low balances in debit accounts if prepaid energy unit accounts are present.
23. Average daily cost of operation of whole premise and individual appliances on a 30, 60 and 90 day rolling average and same period last year.
24. Data, text and billing messages from energy unit suppliers and information sources.
25. Weather information and history data including, at a minimum, outside temperature lows and highs, humidity, chance of precipitation wind speed and direction, solar exposure time and angle and UV indexes by day, by week, by billing period.
26. Total heating and cooling degree days and other statistical data needed to normalize consumption and usage data.
27. Computed thermal recovery time for heating and cooling adjusted to compensate for the external temperature, wind speed, direction, UV index, humidity and cooling or heating degree day factors. This computed factor is used to more accurately compute the recovery time for thermal gain or loss when combined with the average normalized thermal gain or loss for the premise. This factor may also be computed centrally and transmitted, frequently enough to permit adequate factoring of recovery times to maximize efficiency and reduce operating costs. Transmitting centrally computer factors will eliminate the need for external sensors at each location, thus lowering the cost of installation and ongoing maintenance.
28. A Table of available energy suppliers and user-defined preference indicators by supplier and type of energy units provided to be used in choosing the supplier of choice if price points and terms of sale are equal during a given time period.
29. A table used to compute supplier parity when option 28 above is not entered which contains at a minimum, the available suppliers, the type of energy units available and the number and cost of energy units purchase this billing period.
30. An optional user-supplied preferred energy unit type indicator.
31. User-selected temperature ramping option indicator with default 1 degree per hour ramping and optional user-defmed ramping time frames and degree settings.
32. Low and high temperature alarm settings to protect against heating and cooling system failures. This alarm trigger point is user-defined, and if not entered, defaults to + or −5 degrees above and below the maximum dead-band comfort range entered by the user. This feature is defeated if the system is placed in the off position, but will be overridden if the user elects to activate the temperature alarm mode capability of the system.
33. Alarm activation indicator which is user-selected to permit the automatic alarming and notification of a monitoring service if one is available and subscribed to by the occupant, owner or system provider. Alarm points and settings are user-defined or can be allowed to default to system-defined default points based on the users, owners or operators preference.
34. Communications channel interface parameters and data including types and routing information necessary to perform communications activities on the attached network or networks available. These parameters include all information required to perform password verification and encryption as needed or deemed necessary by the owner, operator or communications system provider. These parameters also include the necessary routing and identification data for alarm trigger reporting points and services used by or subscribed for or available to the premise.
35. Consumption rates and consumption signature and weather-related normalization factors for major appliances in the premise under the control of the system for which a direct form of metering consumption is not available. Estimated consumption rates for major appliances in the premise under the control of the system for which a direct form of metering consumption is not available.
36. Centralized load aggregation and computational service providers interface information.
37. Computed normalization factor for the premise based on historical consumption and external factors.
38. Energy efficiency factors derived from modeling the premise using a model such as the DOE-2.1 modeling system for comparison of operational efficiency.
39. Minimum requirements dead-band range definitions to be used when the premise if vacant or unoccupied.
40. Set point pattern change tracking tables to reflect specific day, time and day type setting changes to be used with "follow my lead" artificial intelligence learning and execution routines.
41. Set point pattern change tracking tables to reflect specific outside weather conditions in relationship to set point changes initiated by the occupant for use with the "follow my lead" artificial intelligence learning and execution routines.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. An indoor environmental condition control and energy management system comprising:

a user input that receives user input parameters including a desired indoor environmental condition range for at least one energy unit price point;

an indoor environmental condition input that receives a sensed indoor environmental condition;

an energy price input that receives a schedule of projected energy unit prices per time periods;

a processor, coupled to the inputs, that computes an environmental condition deadband range for multiple energy unit price points based on the user input parameters, and that controls at least one energy-consuming load device to maintain the indoor environmental condition within the computed deadband range for a then-current energy unit price point.

2. The system claimed in claim 1 wherein the environmental condition includes at least temperature, the at least one load device includes a heating and cooling system.

3. The system claimed in claim 2 wherein the processor controls the heating and cooling system to ramp up or down indoor temperature during certain time periods to reduce energy consumption cost.

4. The system claimed in claim 1 wherein multiple deadband ranges may be selected by a user for different time periods.

5. The system claimed in claim 1 further including a communications link through which the process communicates with at least one energy supply company and wherein the processor selects one energy supply company to minimize energy consumption cost.

6. The system claimed in claim 5 wherein the processor may select between suppliers of different types of energy.

7. The system claimed in claim 5 wherein the processor communicates information to at least one energy supply company.

8. The system claimed in claim 7 wherein the information includes at least one of energy consumption data, energy usage schedule, cost information and account information.

9. The system claimed in claim 1 further including an outdoor environmental condition input that receives a sensed outdoor environmental condition and wherein the processor controls the at least one energy-consuming load device based in part on the sensed outdoor environmental condition.

10. The system claimed in claim 1 wherein the processor controls operation of the at least one load device to repeat a pattern of usage by the user over a time period.

11. The system claimed in claim 1 wherein the at least one load device includes a plurality of energy-consuming load devices.

12. The system claimed in claim 11 wherein the processor monitors energy consumption by each load device.

13. The system claimed in claim 1 wherein the processor monitors and controls each of a plurality of energy-consuming load devices based on user input parameters relating to usage of the energy-consuming load devices.

14. The system claimed in claim 1 further includes means, coupled to processor, for controlling an on-premise energy-generating device to operate during periods of higher cost from an energy supplier.

15. The system claimed in claim 1 further including a central processor, coupled to the local processor over a communications channel, for monitoring energy consumption at a plurality of premises.

16. The system claimed in claim 1 further including means for receiving an indication of premise occupancy and wherein the processor computes a vacancy deadband range and an occupied deadband range.

17. The system claimed in claim 1 further including means for activating an alarm when an extreme environmental condition is sensed.

18. An energy consumption management and environmental condition control system comprising:

a user input for receiving user input parameters including at least an energy unit price cutoff point and a desired environmental condition comfort range;

an environmental condition input for receiving information relating to a sensed environmental condition;

an energy supply company input for receiving energy supply company pricing information; and a local processor, coupled to the inputs, that controls operation of at least one energy-utilizing load on a premise to optimize an indoor environmental condition and minimize energy consumption cost, based on the user input parameters, the at least one load including an indoor environmental condition control device.

19. The system claimed in claim 18 wherein the at least one load includes a plurality of loads, the environmental condition includes temperature and the environmental condition control device includes a heating and cooling system.

20. The system claimed in claim 19 wherein the local processor analyzes energy supply company pricing information and selects between multiple energy supply companies to minimize cost.

21. The system claimed in claim 19 wherein the local processor monitors total energy consumption per a time period by all of the loads of the premise and by each load individually.

22. The system claimed in claim 21 wherein the local processor records historical load energy usage and computes projected estimated energy consumption for at least one load based on the historical usage and the inputs.

23. The system claimed in claim 22 wherein the local processor selects an energy supply company based on projected estimated energy consumption to minimize future energy consumption cost.

24. The system claimed in claim 22 wherein the processor compares historical energy consumption with current energy consumption for at least one load and monitors differences.

25. The system claimed in claim 21 further including a central processor, coupled to at least one local processor through a communication channel, for monitoring and controlling energy consumption and cost for each premise including a local processor.

26. The system claimed in claim 19 wherein the local processor controls operation of each load individually based on user input and energy supply company input to minimize energy consumption cost.

27. The system claimed in claim 26 wherein the user input includes an energy cost cutoff point for each of a plurality of loads and wherein the processor will control each load to operate only until the energy cost cutoff point is reached for that load.

28. The system claimed in claim 19 further including a communication channel, coupled to the local processor, through which the local processor and at least one energy supply company communicate.

29. The system claimed in claim 19 wherein the user input parameters include a desired temperature and minimum and maximum temperature levels for at least one energy price point, wherein the processor computes a deadband temperature range for available energy price levels and wherein the processor controls the heating and cooling system to maintain an indoor temperature within the deadband range at a then-current energy price level.

30. The system claimed in claim 29 wherein the user input parameters include multiple deadband temperature ranges for different time periods.

31. The system claimed in claim 19 wherein the processor controls operation of the heating and cooling system to repeat a pattern of usage by the user over a time period.

32. An energy management system comprising:

a plurality of local load controlling processors, each local processor monitors energy consumption and controls operation of at least one energy-utilizing load to optimize an indoor environmental condition and minimize energy consumption cost, based at least on user input parameters relating to desired energy cost information and an environmental condition comfort range, the at least one load including an indoor environmental condition control device; and a central processor, communicating with each local processor over a bus system, and communicating over a communications channel with at least one energy supply company, that analyzes energy consumption and cost for each local processor and that selects an energy supply company for each local processor.

33. The system claimed in claim 32 wherein at least some of the local processors are located on different premises.

34. The system claimed in claim 33 wherein each local processor computes an environmental condition deadband range for multiple energy unit price points based on the user input parameters and that controls the indoor environmental condition within the deadband range for a then-current energy unit price point.

35. A method for managing energy consumption and controlling an indoor environmental condition for a premise comprising the steps of:

receiving user input parameters including a desired indoor environmental condition range for at least one energy unit price point;

receiving a sensed indoor environmental condition;

receiving a schedule of projected energy unit prices;

computing an indoor environmental condition deadband range for multiple energy unit price points based on the user input parameters; and controlling at least one energy-consuming load device to maintain the sensed indoor environmental condition within the computed deadband range for a then-current energy unit price point.

36. The method claimed in claim 35 further including the steps of monitoring energy consumption for each of a plurality of energy-consuming load devices and controlling operation of each load device to maintain energy consumption cost within a desired user input cutoff point.

37. The method claimed in claim 35 further including the step of selecting an energy supply company to minimize energy consumption cost.

* * * * *